US005558753A

United States Patent [19]
Gallagher et al.

[11] Patent Number: 5,558,753
[45] Date of Patent: Sep. 24, 1996

[54] POLARITY REVERSAL AND DOUBLE REVERSAL ELECTRODEIONIZATION APPARATUS AND METHOD

[75] Inventors: Christopher J. Gallagher, Burlington; Frederick Wilkins, Pepperill; Gary C. Ganzi, Lexington, all of Mass.

[73] Assignee: U.S. Filter/Ionpure, Inc., Lowell, Mass.

[21] Appl. No.: 437,624

[22] Filed: May 9, 1995

Related U.S. Application Data

[62] Division of Ser. No. 246,815, May 20, 1994.

[51] Int. Cl.$^6$ ................................................. B01D 61/48
[52] U.S. Cl. ........................ 204/632; 204/634; 204/637; 204/633
[58] Field of Search ............................. 204/301, 182.4, 204/182.5, 632, 633, 634, 637

[56] References Cited

U.S. PATENT DOCUMENTS

| | | | |
|---|---|---|---|
| 2,689,826 | 9/1954 | Kollsman | 204/301 |
| 2,758,965 | 8/1956 | Block | 204/180 |
| 2,810,686 | 10/1957 | Bodamer et al. | 204/130 |
| 2,815,320 | 12/1957 | Kollsman | 204/182.4 |
| 2,829,095 | 4/1958 | Oda et al. | 204/98 |
| 2,854,394 | 9/1958 | Kollsman | 204/182.4 |
| 2,863,813 | 12/1958 | Juda et al. | 204/182.4 |
| 2,923,674 | 2/1960 | Kressman | 204/182.4 |
| 3,014,855 | 12/1961 | Kressman | 204/182.4 |
| 3,099,615 | 7/1963 | Kollsman | 204/182.4 |
| 3,149,061 | 9/1964 | Parsi | 204/182.4 |
| 3,192,148 | 6/1965 | Kwo-Wei Chen | 204/301 |
| 3,220,941 | 11/1965 | Osborne | 204/87 |
| 3,291,713 | 12/1966 | Parsi | 204/182.4 |
| 3,310,481 | 3/1967 | Mock et al. | 204/180 |
| 3,330,750 | 7/1967 | McRae et al. | 204/182.4 |
| 3,341,441 | 9/1967 | Giuffrida et al. | 204/182.4 |
| 3,510,418 | 5/1970 | Mizutani | 204/181 |

(List continued on next page.)

FOREIGN PATENT DOCUMENTS

| | | |
|---|---|---|
| 0032021 | 7/1981 | European Pat. Off. . |
| 0346502 | 12/1989 | European Pat. Off. . |
| 0417506 | 3/1991 | European Pat. Off. . |
| 2645044 | 10/1990 | France . |
| 3808043 | 9/1989 | Germany . |
| 4135166 | 5/1992 | Germany . |
| 60-78603 | 5/1985 | Japan . |
| 6-262182 | 9/1994 | Japan . |
| 2249307 | 5/1992 | United Kingdom . |
| WO79/00040 | 2/1979 | WIPO . |
| WO89/00453 | 1/1989 | WIPO . |
| WO95/29005 | 11/1995 | WIPO . |

OTHER PUBLICATIONS

Gittens, G. J., "The Application of Electrodialysis to Demineralisation", AIChE Symposium Series No. 9, 1965, pp. 79–83.

(List continued on next page.)

Primary Examiner—Arun S. Phasge
Attorney, Agent, or Firm—Wolf, Greenfield & Sacks, P.C.

[57] ABSTRACT

Electrodeionization apparatus having a novel polarity reversal protocol designed to provide continuous, high-quality product fluid is described. The protocol involves substitution of a recirculating fluid stream established in an ion-concentrating compartment by a fluid stream having a lower ionic concentration, while maintaining fluid flow through an adjacent ion-depleting compartment. A method and protocol for modifying the ionic makeup of compartment ion exchange material and fluids are also provided. A flow reversal protocol is also provided, during which high-quality fluid product is recovered from the inventive apparatus. The polarity reversal protocol and flow reversal protocol may each be effected separately, or the flow reversal may be introduced into the sequence of the polarity reversal protocol. The inventive electrodeionization apparatus is arranged in a novel cell pair grouping configuration and oriented such that fluid flow through an ion-concentrating compartment is in a substantially upward direction, facilitating efficient removal of gas generated in the ion-concentrating compartment.

24 Claims, 18 Drawing Sheets

U.S. PATENT DOCUMENTS

| | | | |
|---|---|---|---|
| 3,515,664 | 6/1970 | Johnson et al. | 204/301 |
| 3,725,235 | 4/1973 | Mintz | 204/180 |
| 3,905,886 | 9/1975 | Wang | 204/180 |
| 4,012,324 | 3/1977 | Gregor | 210/500 |
| 4,024,043 | 5/1977 | Dege et al. | 204/296 |
| 4,032,452 | 6/1977 | Davis | 210/243 |
| 4,057,483 | 11/1977 | Giuffrida | 204/301 |
| 4,115,225 | 9/1978 | Parsi | 204/182.4 |
| 4,116,889 | 9/1978 | Chlanda et al. | 521/27 |
| 4,148,708 | 4/1979 | Grant | 204/301 |
| 4,217,200 | 8/1980 | Kedem et al. | 204/301 |
| 4,284,492 | 8/1981 | Karn | 204/299 |
| 4,381,232 | 4/1983 | Brown | 204/182.4 |
| 4,391,680 | 7/1983 | Mani et al. | 204/98 |
| 4,461,691 | 7/1984 | Frank | 204/242 |
| 4,465,573 | 8/1984 | O'Hare | 204/182.4 |
| 4,504,373 | 3/1985 | Mani et al. | 204/180 |
| 4,536,269 | 8/1985 | Chlanda et al. | 204/182.4 |
| 4,608,140 | 8/1986 | Goldstein | 204/182.3 |
| 4,608,141 | 8/1986 | Chlanda et al. | 204/182.5 |
| 4,632,745 | 12/1986 | Giuffrida et al. | 204/301 |
| 4,636,296 | 1/1987 | Kunz | 204/182.5 |
| 4,656,573 | 4/1987 | Lee | 363/49 |
| 4,687,561 | 8/1987 | Kunz | 204/182.5 |
| 4,738,764 | 4/1988 | Chlanda et al. | 204/296 |
| 4,740,281 | 4/1988 | Chlanda et al. | 204/151 |
| 4,747,929 | 5/1988 | Siu et al. | 204/301 |
| 4,766,161 | 8/1988 | Chlanda et al. | 521/27 |
| 4,804,451 | 2/1989 | Palmer | 204/301 |
| 4,822,471 | 4/1989 | MacDonald | 204/301 |
| 4,871,431 | 10/1989 | Parsi | 204/182.4 |
| 4,923,611 | 5/1990 | Hanada et al. | 210/638 |
| 4,925,541 | 5/1990 | Giuffrida et al. | 204/182.5 |
| 4,931,160 | 6/1990 | Giuffrida | 204/301 |
| 4,956,071 | 9/1990 | Giuffrida et al. | 204/301 |
| 4,969,983 | 11/1990 | Parsi | 204/182.4 |
| 5,026,465 | 6/1991 | Katz et al. | 204/182.4 |
| 5,066,375 | 11/1991 | Parsi et al. | 204/182.4 |
| 5,116,509 | 5/1992 | White | 210/644 |
| 5,120,416 | 6/1992 | Parsi et al. | 204/182.4 |
| 5,126,026 | 6/1992 | Chlanda | 204/182.4 |
| 5,154,809 | 10/1992 | Oren et al. | 204/182.4 |
| 5,203,976 | 4/1993 | Parsi et al. | 204/182.4 |
| 5,308,466 | 5/1994 | Ganzi et al. | 204/151 |
| 5,316,637 | 5/1994 | Ganzi et al. | 204/182.4 |

OTHER PUBLICATIONS

Matejka, Z., "Continuous Production of High–Purity Water by Electro–deionisation", J. Appl. Chem. Biotechnol, vol. 21 pp. 117–120, Apr. 1971.

G. Wisniewska et al., "Dialytic Properties of Domestic Ion–Exchange Membranes For Desalination of Saline Water By Electrodialysis", Environmental Protection Engineering, 1989, vol. 15, No. 3–4, pp. 155–162.

Sudoh, M. et al., "Donnan Dialysis Concentration Using Cation–Exchange Membrane Prepared By Paste Method", J. Chem. Eng. Japan, vol. 23, No. 6, 1990, pp. 280–685.

Strathmann, H. et al., "Effluent Free Electrolytic Regeneration of Ion–Exchange Resins", 1982, pp. 145–158.

Glueckauf, E., "Electro–Deionisation Through a Packed Bed", pp. 646–651, British Chemical Engineering Dec. 1959.

Davis, T. A., "Electrodialysis", Notes from the Center for Professional Advancement Industrial Membrane Tech. Course 1989.

Korngold, E., "Electrodialysis Processes Using Ion Exchange Resins Between Membranes", Elseiver Scientific Publishing Co., Mar. 14, 1975, vol. 16, pp. 225–233.

Cooke, B. A., "Scaling Problems In Electrodialysis Using Permselective Membranes", Chem. and Indus. May 10, 1958 pp. 555–556.

Ghowsi et al., "Some Aspects of the High Frequency Conductance of Electrolytes", J. Electrochem Soc., vol. 136, No. 10, pp. 2806–2811, Oct., 1989.

Gittens, G. H. et al., "Some Experimental Studies of Electrodeionisation Through Resin Packed Beds", U.K.A.E.A. Research Group, pp. i–33, Mar. 1964.

Weida, J., "Use of Electrodialyzer with Ion–Exchange Conducting Spacer in Production of Demineralized Water for Bleaching Raw Silk Fabric", The Development Center of Seawater Desalination and Water Treatment Tech., pp. 61–64, Paper No. S1–1h, (no date).

Ganzi, G. C. et al., "Water Purification and Recycling Using The Ionpure CDI Process", AIChE Summer national Meeting, Pittsburgh, Aug. 19, 1991, Paper 46c, pp. 1–11.

POLARITY REVERSAL AND DOUBLE REVERSAL ELECTRODEIONIZATION APPARATUS AND METHOD

This application is a division of application Ser. No. 246,815 filed May 20, 1994.

FIELD OF THE INVENTION

The present invention relates to electrodeionization apparatus, and more particularly to electrodeionization apparatus having a novel polarity reversal scheme and providing flow reversal through ion-depleting and ion-concentrating compartments with continuous product recovery.

BACKGROUND OF THE INVENTION

The purification of liquids by reducing the concentration of ions or molecules in the liquid has been an area of substantial technological interest. Many techniques have been used to purify and isolate liquids or to obtain concentrated pools of specific ions or molecules from a liquid mixture. Well-known processes include distillation, electrodialysis, reverse osmosis, liquid chromatography, membrane filtration, ion exchange, and electrodeionization. Modern electrodeionization units are described, for example, in commonly-owned U.S. Pat. Nos. 5,308,466, issued May 3, 1994, and 5,316,637, issued May 31, 1994, both to Ganzi et al.

One problem associated with many liquid purification devices is the formation of scale on various liquid-contacting surfaces. In the case of electrodeionization apparatus, for example, scale is known to form on ion-exchange membranes which define ion-depleting and ion-concentrating compartments as well as on ion-exchange resins contained within at least some of the compartments.

Numerous methods to prevent or remove scale formation in electrical water purification apparatus have been attempted. For example, U.S. Pat. No. 2,854,394 to Kollsman describes the use of polarity reversal in electrodialysis devices as a way to reduce clogging of pores contained in the membranes used in such devices.

Polarity reversal techniques have been used in electrodeionization devices as well. For example, U.S. Pat. No. 4,956,071 to Giuffrida et al., describes a polarity reversal electrodeionization device that exploits the partial hydrogen and hydroxide regeneration of the resin bed, and provides for non-simultaneous switching of the polarity across the device and the interchange of the concentrating and depleting streams. Continuous production of purified water results. U.S. Pat. No. 5,026,465 to Katz et al., describes a polarity reversal electrodeionization device in which the concentrating and depleting streams are interchanged while, simultaneously, the polarity across the device is switched.

Although the use of polarity reversal for the removal of foulants, contaminants, and scale from the electrodes, membranes, and resins contained within various electrically driven deionization and fractionation devices is known, the results to date have been less than satisfactory. For example, the "time-to-quality", that is, the length of time following polarity reversal required for the new ion-depleting compartments to produce water of acceptable quality, is substantially longer than desired for many applications. Additionally, carbon dioxide gas is typically generated in fluid in ion-concentrating compartments of electrodeionization apparatus. The presence of carbon dioxide in the gaseous state in ion-concentrating compartments causes a disadvantageous increase in electrical resistance across these compartments. Carbon dioxide dissolved in fluid in ion-concentrating compartments exists in equilibrium with carbonic acid, the presence of which is disadvantageous as carbonic acid is weakly ionized, therefore not a good conductor, and not easily removed from solution. Also, chemical and biological control within ion-concentrating compartments in many known electrodeionization devices is lacking.

Another complication associated with the operation of electrodeionization apparatus is that such devices often require further the elimination of foulant particles from process streams that tend to settle between the resin particles within the device, especially when low-quality feed water is used. Such foulant particles tend to plug the device, causing a reduction in the flow of product and concentrate streams and an increase in the pressure drop across the device. The problem of resin fouling is particular to electrodeionization and not to electrodialysis, as electrodialysis compartments are free of ion exchange resins. One option for avoiding this problem is backwashing the apparatus with the resin in place. Such a process is described in U.S. Pat. No. 4,692,745 to Giuffrida et al. Backwashing is an intermittent process where the flow through the concentrating and depleting compartments is reversed during a period in which no power is provided to the device electrodes. The reverse flow effluent comprises a waste stream containing a particular material which is normally discarded to drain. Another option is backwashing the apparatus with the resin removed. Such a process is described in U.S. Pat. No. 5,120,416 to Parsi et al. This process necessarily involves refilling the compartments which contain resin, which is cumbersome and time-consuming. Both of these options necessarily involve apparatus downtime.

Despite the attempts described above, a need exists for an electrodeionization apparatus which avoids the build-up of scale and fouling (or which allows scale and foulants to be removed) while providing a continuous, high purity product stream.

A need also exists for electrodeionization apparatus capable of continuous high-purity product recovery that can be easily fabricated, and that can be manually or automatically sequenced through a polarity reversal process with good time-to-quality.

A need also exists for electrodeionization apparatus allowing good control of chemical and/or biological species in an ion-concentrating compartment array.

Additionally, a need exists for efficient removal of gas generated in ion-concentrating compartments during electrodeionization apparatus operation.

SUMMARY OF THE INVENTION

The present invention is an improved electrodeionization polarity reversal module and system that substantially eliminates the build-up of sparingly soluble materials (i.e., scale) that can form within the interstices of the ion-exchange resin packing within the device and on device membranes. The device of the invention is characterized in that it avoids the need to undergo backwashing, and that it is unnecessary to remove or disturb the ion-exchange material contained within the device in order to remove particulates and scale. The inventive device also provides for efficient removal of gas generated in ion-concentrating compartments of electrodeionization apparatus, and provides for good control of chemical and biological parameters within apparatus circuits and compartments.

The electrodeionization system includes a plurality of compartments including at least one ion-concentrating compartment positioned adjacent at least one ion-depleting compartment, the compartments each containing an ion-exchange material and being defined in part by spaced, alternating anion-permeable membranes and cation-permeable membranes. Electrodes are positioned on each side of the plurality of compartments, and in electrical communication with the compartments and an electrical source so that a potential can be applied across the plurality of compartments. The electrodeionization system includes a plurality of fluid circuits, including a first fluid circuit connecting a source of a first fluid stream to the ion-concentrating compartment, and connecting a source of a second fluid stream to the ion-depleting compartment, and a second fluid circuit connecting a source of a third fluid stream to the ion-concentrating compartment, and connecting the source of the second fluid stream to the ion-depleting compartment. The third fluid stream has an ionic concentration lower than that of the first fluid stream.

In this way, a method for purifying a fluid using the electrodeionization system may be carried out. The method involves establishing a first fluid stream through the ion-concentrating compartment and a second fluid stream through the ion-depleting compartment. The electrodes are then energized so as to establish a depleted fluid stream exiting the ion-depleting compartment and a concentrated fluid stream exiting the ion-concentrating compartment, the depleted fluid stream having an ionic concentration lower than that of the second fluid stream. This arrangement is established by way of the first fluid circuit.

Then, by way of the second fluid circuit, a third fluid stream having an ionic concentration lower than that of the first fluid stream is substituted for the first fluid stream, while the second fluid stream is maintained through the ion-depleting compartment, and in this way the ion-concentrating compartment is prepared for service as a second ion-depleting compartment. Subsequently, the ion-depleting compartment is converted to a second ion-concentrating compartment, and the ion-concentrating compartment is converted to a second ion-depleting compartment. This is accomplished by establishing the first fluid stream through the second ion-concentrating compartment and establishing the second fluid stream through the second ion-depleting compartment, and reversing the polarity of the first and second electrodes.

The present invention also provides a method for purifying a fluid using the electrodeionization system described above. The method involves establishing first and second fluid streams through ion-concentrating and ion-depleting compartments of the system, respectively, and energizing the electrodes so as to establish a depleted fluid stream exiting the ion-depleting compartment and a concentrated fluid stream exiting the ion-concentrating department, as described above. The ionic concentration of the first fluid stream then is increased, and the ion-depleting compartment is converted to a second ion-concentrating compartment while the ion-concentrating compartment is converted to a second ion-depleting compartment. The increase in ionic concentration of the first fluid stream prior to interchange of the ion-concentrating and ion-depleting compartments results in improved time-to-quality in the recovery of a depleted fluid product.

The present invention also provides a method for purifying fluid in which a first fluid stream having an ionic concentration is established through an ion-concentrating compartment of an electrodeionization system as described above. An exit fluid stream having an ionic concentration is recovered from the ion-concentrating compartment and is recirculated so as to be established as the first fluid stream. According to the method, the ionic concentration of the recirculated, first fluid stream is increased. This arrangement is established by way of a fluid circuit including a recirculation path arranged to recirculate fluid flow from an exit of the ion-concentrating compartment to an entrance thereof, including a source of species such as chemical species, biological species, and mixtures thereof in fluid communication with the recirculation path.

The present invention also provides a method for purifying a fluid that is especially effective in allowing efficient operation of an electrodeionization system while minimizing build-up of foulants within concentrating or depleting compartments of the system. The method involves establishing a first fluid stream through an ion-concentrating compartment and a second fluid stream through an ion-depleting compartment of an electrodeionization system as described above, and energizing the electrodes so as to establish a depleted fluid stream exiting the ion-depleting compartment and a concentrated fluid stream exiting the ion-concentrating compartment. The method further involves reversing the direction of flow of the first fluid stream through the ion-concentrating compartment and recovering a depleted fluid product from the ion-depleting compartment while the first fluid stream flows through the ion-concentrating compartment in the reversed direction.

This method is accomplished by providing an electrodeionization system as described above, but including a forward flow fluid circuit and a reverse flow fluid circuit. The forward flow fluid circuit connects a source of the first fluid stream to a first port of the ion-concentrating compartment to provide the first fluid stream flowing through the ion-concentrating compartment in a first direction. The forward fluid circuit also connects a source of a second fluid steam to a first port of the ion-depleting compartment to provide the second fluid stream flowing through the ion-depleting compartment in a first direction. The reverse flow fluid circuit connects the source of the first fluid stream to a second port of the ion-concentrating compartment to provide the first fluid stream flowing through the ion-concentrating compartment in a second direction opposite the first direction. The reverse flow fluid circuit may also connect the source of the second fluid stream to a second port of the ion-depleting compartments to provide the second fluid stream flowing through the ion-depleting compartment in a second direction opposite the first direction.

The present invention also provides compartments for electrodeionization apparatus including an arrangement including a plurality of stacked groups of compartments. Each group of compartments is defined in part by exterior membranes at first and second ends of the group, and each group includes a plurality of compartments including at least one ion-concentrating compartment positioned adjacent at least one ion-depleting compartment. The plurality of compartments are defined in part by spaced, alternating membranes permeable to ions of a first polarity and membranes permeable to ions of a second polarity opposite the first polarity. An exterior membrane of at least one group of compartments co-extensively contacts an exterior membrane of an adjacent group in the plurality of stacked groups of compartments. Each ion-concentrating and ion-depleting compartment contains an ion-exchange material.

The compartments of the present invention may be used in any of a wide variety of electrodeionization systems to carry out any of a variety of methods for purification of a fluid, including those systems and methods described above.

DETAILED DESCRIPTION OF THE INVENTION

Figure 1:
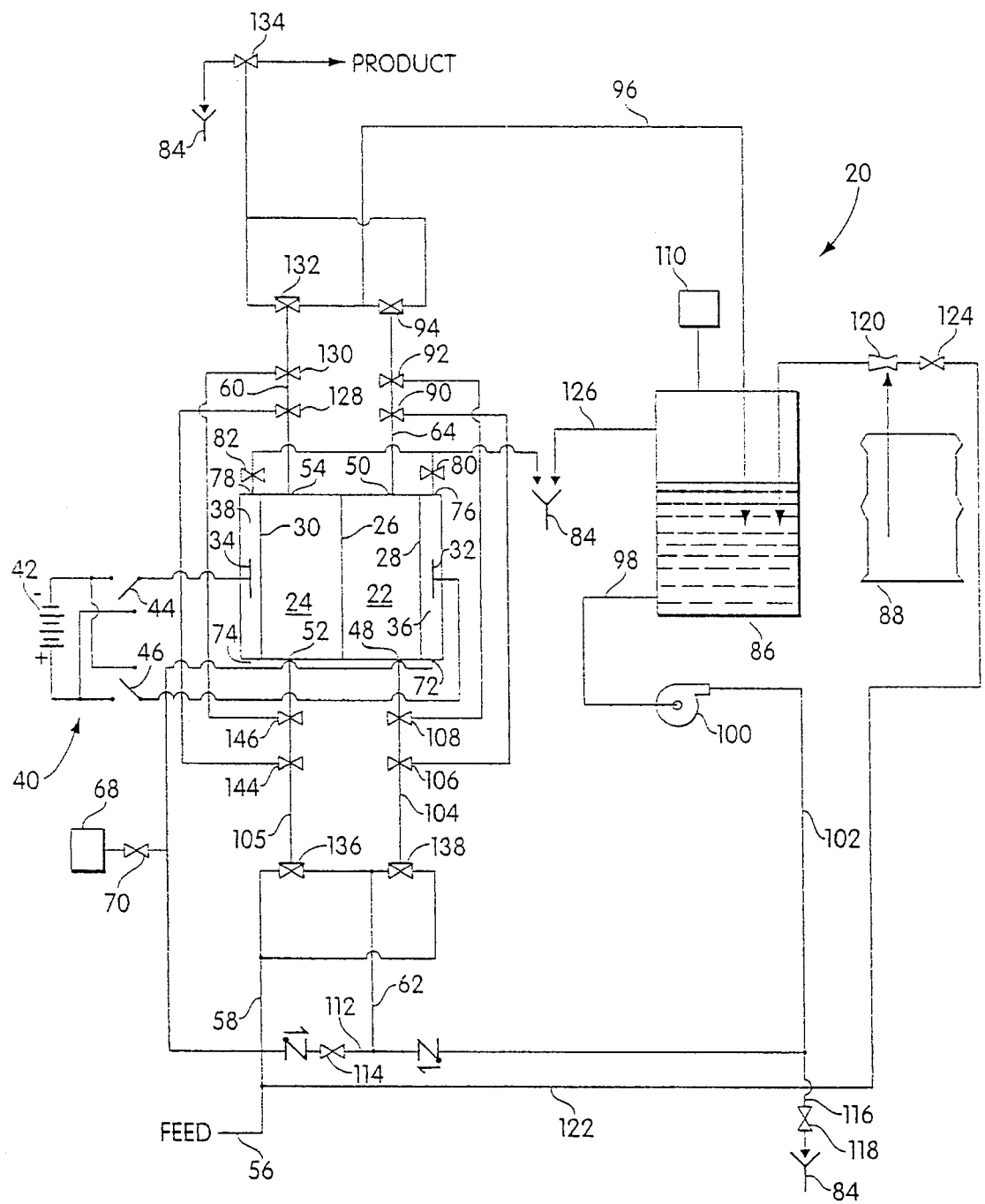
FIG. 1 is a schematic illustration of an electrodeionization apparatus according to a preferred embodiment of the present invention.

In accordance with the invention, an electrodeionization apparatus is provided including one or more electrodeionization stages, wherein each electrodeionization stage includes at least one ion-concentrating compartment positioned adjacent at least one ion-depleting compartment. Preferably, the inventive apparatus includes a series of ion-concentrating compartments which alternate with a series of ion-depleting compartments. The compartments are defined, in part, by spaced apart, alternating, anion and cation-permeable membranes. Each of the concentrating compartments and depleting compartments contains an ion exchange material such as a mixture of anion-exchange resin and cation-exchange resin. Representative suitable ion exchange materials include fibers, woven fibers, beads or the like.

The inventive apparatus includes at least first and second electrodes provided in electrical communication with the ion-concentrating and ion-depleting compartments, and a source of electrical potential provided in electrical communication with the first and second electrodes which, in combination with the electrodes and the compartments, defines an electrical circuit. In this way, an electrical potential may be provided across the ion-concentrating and ion-depleting compartments, or across one or more electrodeionization stages including a plurality of such compartments, so that an ion-depleted product fluid stream may be established during apparatus operation.

During conventional electrodeionization polarity reversal, fluid streams entering compartments are interchanged while polarity across the electrodeionization compartments is reversed, thus the concentrating compartments are defined as second depleting compartments and the depleting compartments are defined as second concentrating compartments. The present invention provides for a novel polarity reversal protocol involving fluid stream substitution, rather than conventional concentrating and depleting fluid stream interchange, during the polarity reversal cycle. The term "substitution" as used herein is intended to describe a change in the fluid stream input to one or more ion-concentrating compartments, while the fluid stress input to one or more ion-depleting compartments of the apparatus does not change, and depleted fluid product recovery from the depleting compartments continues. This change is typically one of ionic concentration, and typically involves lowering the ionic strength of the fluid stream input to the concentrating compartments. The substitution may be accompanied by disconnection of the electrodes from the electrical source so that ionic migration from one or more ion-depleting compartments into the one or more ion-concentrating compartments ceases. In this way, the ionic strength of the fluid in the ion-concentrating compartment or compartments may be lowered in preparation for service by this compartment or these compartments as one or more second ion-depleting compartments.

In addition to the novel substitution step in the inventive polarity reversal protocol, the present invention provides for precise control of chemical and/or biological parameters within an ion-concentrating compartment or compartments, while conserving fluid passing through these compartments, during apparatus operation. This chemical and/or biological control may be provided via a recirculation path which recovers concentrated fluid exiting the ion-concentrating compartments and establishes a loop, directing this fluid to the entrance of the concentrating compartments. This control of chemical and/or biological parameters within the ion-concentrating compartments is effected by introduction into a fluid stream entering the ion-concentrating compartments of one or more species designed to adjust one or more chemical or biological parameters in the ion-concentrating compartments. Such introduction may occur while the ion-depleting compartments continue to produce depleted fluid product. For example, a chemical or biological species advantageously present in ion-depleting compartments during electrodeionization apparatus operation may be introduced into the recirculation path, and in this way, the ion-concentrating compartments may be prepared for service as second ion-depleting compartments. As another example, a particular species that is advantageously absent from ion-depleting compartments during apparatus operation may be removed from the ion-concentrating compartments by introduction, into the recirculation path, of a chemical and/or biological species selected to remove the particular species. This may prepare the ion-concentrating compartments for service as second ion-depleting compartments.

The present invention also provides electrodeionization apparatus designed to reverse the direction of flow of fluid in the ion-concentrating compartments during apparatus operation, while providing uninterrupted recovery of depleted fluid product from apparatus ion-depleting compartments. The direction of flow in the ion-depleting compartments may also be reversed, simultaneously or non-simultaneously with fluid flow reversal in the ion-concentrating compartments, with uninterrupted depleted fluid product recovery. The inventive fluid flow direction reversal provides for maintenance of scale-free, and especially foulant-free ion-concentrating and ion-depleting compartments, even when the inventive apparatus is employed to treat feed fluid of very low quality. The inventive flow-reversal electrodeionization apparatus operation may be carried out separately from, or in conjunction with, the inventive polarity reversal protocol, to provide a novel polarity reversal, flow reversal, or double (polarity and flow) reversal electrodeionization process and apparatus.

In addition to the above-described polarity reversal, flow reversal, or double reversal electrodeionization apparatus, a means and method of efficient removal from ion-concentrating compartments of gas generated therein during apparatus operation is provided. This is accomplished by orienting ion-concentrating compartments such that their fluid inlets are lower than their fluid outlets. In this way, any gas generated during apparatus operation is swept upward. Thus, as this is the direction that gas naturally seeks in a fluid environment having a density higher than gas, the inventive means and method provides for fluid flow complementary to the direction that generated gas naturally seeks, facilitating its efficient removal. Similarly, gas generated at electrodes during electrodeionization apparatus operation may be efficiently removed from electrode compartments by providing electrolyte flow in such compartments in an upward direction.

When a recirculation path is established, the recirculation path may also include a liquid/gas interface, facilitating removal of dissolved gas from fluid exiting the ion-concentrating compartments, which gas is advantageously purged from the fluid prior to re-introduction of the fluid into the concentrating compartments.

In one embodiment of a preferred electrodeionization apparatus, the concentrating and depleting compartments are configured to include a plurality of independent discrete sub-compartments, each of which have a width of about 4 inches or less, preferably between 0.5 and about 1.5 inches. The discrete sub-compartments are formed by securing, such as by bonding, an anion-permeable membrane and a cation-permeable membrane to the periphery of compartment spacers each having ribs which extend across the thickness of and along the length of the compartments. Thus, each sub-compartment is defined by a pair of ribs, an anion permeable membrane, and a cation permeable membrane. The sub-compartments are each filled with ion exchange material.

Preferred embodiments of the present invention include electrodeionization apparatus including one or more groups of compartments, or "dual compartments". Such dual compartments are described in U.S. Pat. No. 4,956,071 to Giuffrida et al., issued Sep. 11, 1990, and incorporated herein by reference. The dual compartments are each defined by an odd number of selectively-permeable membranes, at least one depleting compartment, and at least one concentrating compartment, each of which compartments are divided into sub-compartments, as described above. The ion-permeable membranes are arranged so that the anion-permeable membranes and the cation-permeable membranes alternate along the thickness of the dual compartments. Thus, the dual compartment can include one more cation-permeable membrane than anion-permeable membrane or can include one more anion-permeable membrane or cation-permeable membrane.

The apparatus of the present invention may also comprise one or more electrodeionization stages. An exemplary stage suitable for use in the apparatus of the present invention is described in co-pending, commonly-owned U.S. patent application Ser. No. 07/938,329, filed Aug. 28, 1992, and incorporated herein by reference. In each stage, a stack of depleting and concentrating compartments is positioned between first and second electrodes.

According to a particularly preferred embodiment, each stage of the apparatus of the present invention includes a plurality of stacked groups of compartments, each group defined in part by exterior membranes at either end thereof. An exterior membrane of at least one group co-extensively contacts an exterior member of an adjacent group, and according to a particularly preferred embodiment, all the groups in a stack are arranged adjacent each other with exterior membranes of adjacent groups in co-extensive contact with each other. This arrangement is described more fully below with reference to FIGS. 18a and 18b.

Each electrode is provided in electrical communication with an ion-permeable membrane defining a boundary of a stack of compartments. Such electrical communication may be effected by any known method, for example via an electrolyte in an electrode compartment containing the electrode and defined in part by the ion-permeable membrane. According to one preferred embodiment, each electrode is provided with an adjacent electrode spacer and an ion-permeable membrane wherein an electrolyte passes through the electrode spacer. Optionally, the electrode spacer can be filled with ion exchange resin as well. The electrode spacer may comprise an expanded sheet of material, a screen, or the like, and may be electrically conductive or electrically non-conductive.

The magnitude and variability of the electrical resistance between the electrodes and the membranes immediately adjacent to them are important factors in the performance of the apparatus and the time to quality upon polarity reversal and upon re-start from a standby condition. The electrode compartment electrical resistance is particularly important when electrodeionization apparatus is operated with pretreatment by reverse osmosis or is fed other feed streams of relatively low ionic content and is cases where the electrode compartment construction comprises spacers and screens that are not intrinsically conductive.

In the case where feed water has a relatively low ionic content, such as downstream of reverse osmosis apparatus, ionic impurities are often predominantly weakly ionized compounds, such as carbonic acid, mixed with relatively low concentrations of strong ions and intermediate strength ions, such as sodium and bicarbonate ions, respectively. It is preferred to conserve and increase the relative concentration of strong ions within the apparatus and streams by the choice of the liquids fed to the electrode compartments and by the choice of membranes immediately adjacent to the electrodes. It is also preferred to minimize the variability of the electrode stream electrical resistance to avoid the need to control apparatus voltage.

For apparatus that reverse polarity, it is preferred that the membrane be of the same type adjacent to each electrode. In such apparatus, the electrode stream conditions are the same for each half cycle of operation. The preferred choice for the feed to the electrode streams is the feed water. Feed water, although lower in ionic strength than the concentrating stream at steady state, is more consistent in concentration. Also, during polarity reversal and immediately upon apparatus startup, the feed stream is often higher in ionic strength than the concentrating stream.

The remaining portion of each stage comprises a series of alternating depleting and concentrating compartments constructed as set forth herein. The liquid to be depleted of ions can be passed in parallel through each depleting compartment in each stage and a second liquid can be passed through each concentrating compartments in parallel in each stage in order to effect removal of ions from the first liquid in the depleting compartments and into the second liquid in the concentrating compartment.

Reference will now be made to the Figures, and a preferred polarity reversal protocol will be described. It is to be understood that the process steps and fluid circuits of the present invention, and other features may each be exploited independently of the preferred protocol described below.

Referring now to FIG. 1, electrodeionization apparatus arrangement 20 is illustrated schematically and includes ion-concentrating compartment 22, and ion-depleting compartment 24 positioned adjacent ion-concentrating compartment 22 and separated therefrom by selectively permeable membrane 26. Ion-concentrating compartment 22 is further defined by selectively-permeable membrane 28, and adjacent ion-depleting compartment 24 is further defined by selectively-permeable membrane 30. Thus, ion-concentrating compartment 22 and ion-depleting compartment 24 are defined by substantially parallel selectively-permeable membranes 26, 28 and 30, which are alternating anion-permeable and cation-permeable membranes. As will be apparent to those of ordinary skill in the art, the particular permeability of each of the membranes 26, 28 and 30 is not important. They need only alternate in terms of their specific ion permeability. For purposes of illustration, membranes 28 and 30, defining outer boundaries of compartments 22 and 24, are cation-permeable membranes, and membrane 26, separating compartments 22 and 24 is an anion-permeable membrane.

To provide an electrical potential across compartments 22 and 24, first electrode 32 and second electrode 34 are provided in electrical communication with cation-permeable membranes 28 and 30, respectively. That is, the electrodes are provided on first and second sides of the pair of compartments 22 and 24, and in electrical communication therewith. As described above, such electrical communication may take a variety of forms. Alternatively, electrodes 32 and 34 may be provided in electrode compartments 36 and 38, respectively, defined in part by membranes 28 and 30, and containing electrolyte to provide electrical communication between the electrodes and the membranes. This arrangement is illustrated in FIG. 1. Additionally, although not illustrated, a spacer may physically separate electrode 32 from membrane 28, and electrode 24 from membrane 30, the spacer providing electrical communication between the electrodes and the membranes, and/or allowing for the passage of electrolyte through voids in the spacer. Electrodes 32 and 34 are contained in an electrical circuit 40, including an electrical source 42 which is electrically connected to electrodes 32 and 34. Source 42 is a source of alternating or direct current. If a source of alternating current is employed, a rectifier is connected to the source to provide direct current to the apparatus. According to the embodiment illustrated in the figures, source 42 is one of direct current, or constant polarity potential, and electrical circuit 40 includes means for applying a positive polarity to electrode 32 and a negative polarity to electrode 34, or applying a positive polarity to electrode 34 and a negative polarity to electrode 32. Thus, the polarity of electrodes 32 and 34 may be controlled, and may be reversed. As illustrated, electrical switches 44 and 46 may be switched to connect first electrode 32 to a positive pole of electrical source 42 while connecting second electrode 34 to a negative pole of source 42, or may be switched to apply opposite polarities to electrodes 32 and 34.

Although a source of constant potential as electrical source 42 of the present invention is illustrated, a source of constant current may also be employed. According to some electrodeionization apparatus arrangements, employment of a constant current source is disadvantageous as the potential across the compartments is caused to increase to unacceptable levels as electrical resistance across the compartments increases due to gas generation, fouling or scaling, high purity levels in depleting compartments, and the like. However, a source of constant current is more feasibly employed in the apparatus of the present invention than in prior art electrodeionization arrangements, as the inventive polarity reversal, flow reversal, double reversal, upward flow, and other novel features act to maintain parameters within the apparatus, such as scaling and fouling parameters, within a range acceptable for employment of a constant current source.

As illustrated in FIG. 1, the purification center of electrodeionization apparatus 20 includes but one ion-concentrating compartment 22 and one ion-depleting compartment 24 adjacent to ion-concentrating compartment 22. However, although such an arrangement is feasible, it is provided for schematic illustration only and is not preferred. According to a preferred embodiment, a plurality of alternating ion-concentrating and ion-depleting compartments, defining a stage of compartments, would be arranged between electrode 32 and 34, and this arrangement is described more fully below.

Ion-concentrating compartment 22 includes first port 48 and second port 50 and ion-depleting compartment 24 includes first port 52 and second port 54. Preferably, ports 48 and 50 of ion-concentrating compartment 22 are at substantially opposite ends of the compartment, and ports 52 and 54 of ion-depleting compartment 24 are similarly arranged. As will become apparent from the description below, ports 48, 50, 52 and 54 may serve as fluid entrances or exits of the compartments, depending upon whether flow reversal is employed, and at what stage of a flow reversal protocol the apparatus is operational.

Ports 48, 50, 52, and 54 of compartments 22 and 24 are connected to a fluid circuit network having a plurality of fluid pathways defined by conventional conduits and valves. The valves may be adjusted according to predetermined settings so as to provide fluid communication between any of the ports 48, 50, 52, and/or 54 with feed fluid inlets, product fluid outlets, a source of chemical and/or biological species, a gas/liquid interface tank, or a recirculation pathway connecting a first port 48 or 52 with a second port 50 or 54 of ion-concentrating compartment 22 or ion-depleting compartment 24, respectively. Such adjustment and connection will be described below with respect to subsequent illustrations, according to a variety of fluid circuits. As used herein, the term "fluid circuit" is intended to define a particular arrangement of valves of apparatus 20 providing a particular predetermined fluid stream through compartment 22 and a particular predetermined fluid stream through compartment 24.

The remaining features and circuits of apparatus 20 will be described with reference to FIGS. 2–15. In all of the figures, elements of apparatus 20 common to several figures are represented by common numerical designations. In the figures, bold lines represent pathways through which fluid flows according to the fluid circuit arrangement of the polarity reversal protocol step illustrated. For purposes of illustration, the preferred embodiment of the present invention will be described in terms of water purification. However, it is to be understood that the treatment of any fluid treatable by electrodeionization apparatus will generally benefit from employment of the apparatus of the present invention.

Figure 2:
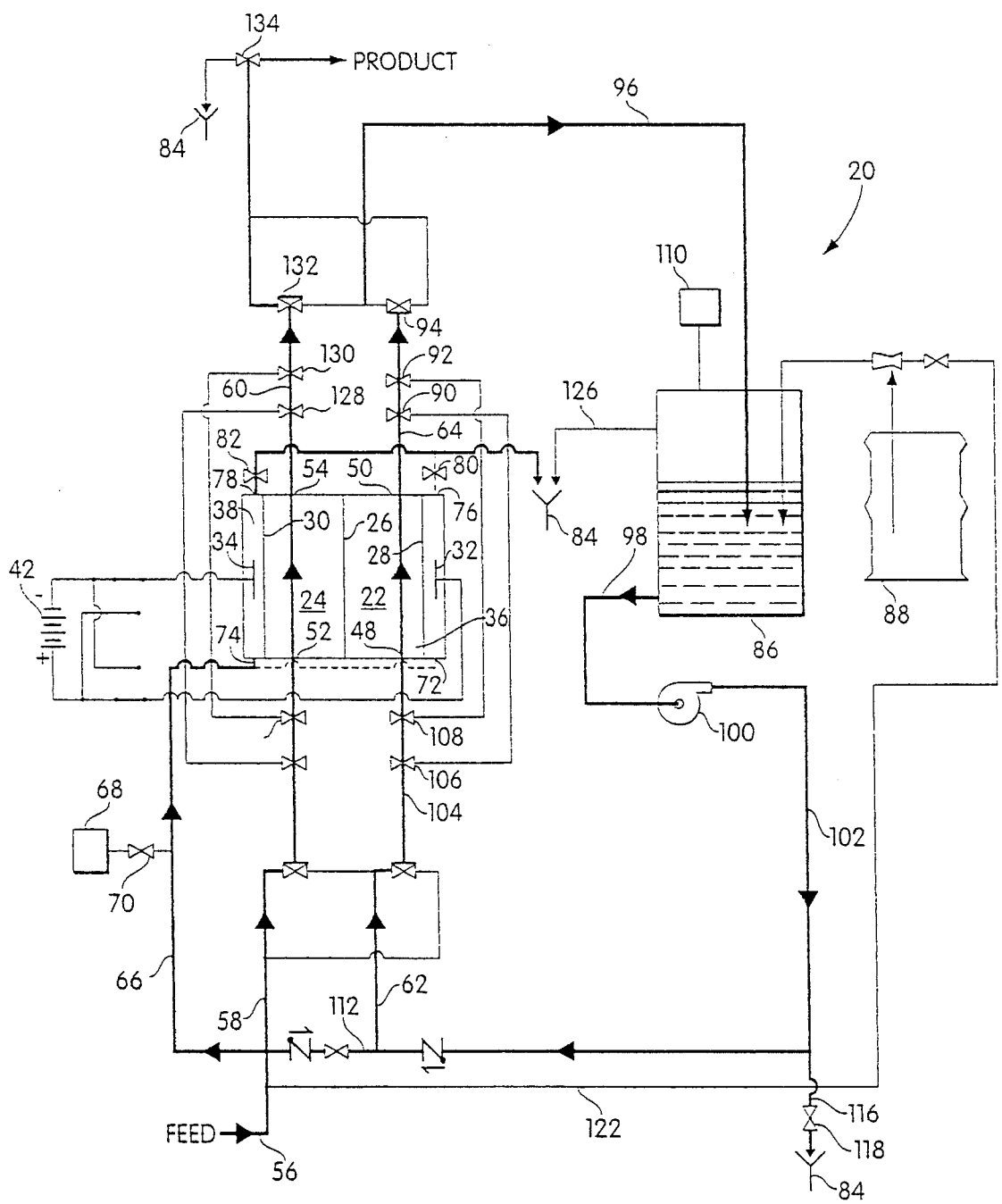
FIG. 2 is a schematic illustration of a preferred embodiment of the inventive apparatus adjusted so as to define a first fluid circuit.

In FIG. 2, a first fluid circuit arrangement is illustrated in which feed liquid, for example tap water, brackish water, or pre-treated semi-pure water enters apparatus 20 at feed inlet 56. As used herein, the term "fluid circuit" is meant to define one or more fluid pathways which together provide for a desired flow of fluid through ion-concentrating compartments 22 and ion-depleting compartments 24. Each fluid circuit of the electrodeionization apparatus of the present invention can be created by setting valves, or the like, to predetermined positions. That is, when the apparatus of the present invention is switched from a first fluid circuit to a second fluid circuit, this may be accomplished by altering the position of one or more valves, and disassembly and reassembly any apparatus components is unnecessary.

In the first fluid circuit illustrated in FIG. 2, feed inlet 56 serves as a source of a fluid stream 58 having a particular ionic concentration that is connected to ion-depleting compartment 24, and in particular to first port 52 thereof. The first fluid circuit also provides for connection of a fluid stream 62 having a particular ionic concentration to ion-concentrating compartment 22, and in particular first port 48 thereof.

As used herein, the term "ionic concentration" is meant to define the ionic makeup of a particular fluid. Thus, a first ionic concentration may differ from a second ionic concentration in terms of ionic strength, the presence or absence of particular ionic species, or both. For example, a first fluid stream having a first ionic concentration may differ from a second fluid stream having a second ionic concentration in ionic strength alone, while both fluid streams include, exclusively, a similar ionic species. Or, the first fluid stream and the second fluid stream may be of similar or identical ionic strength, the first fluid stream containing a particular concentration of a first ionic species and the second fluid stream containing a particular concentration of a second ionic species different from the first ionic species.

As would be apparent to those of ordinary skill in the art, when apparatus 20 is operated such that a positive polarity is applied to first electrode 32 while a negative polarity is applied to second electrode 34, when selectively permeable membrane 26 is an anion-permeable membrane and selectively permeable membranes 28 and 30 are cation-permeable membranes, a fluid stream 58 established in ion-depleting compartment 24 is depleted of ionic species to establish a depleted fluid stream 60 exiting ion-depleting compartment 24, specifically at second port 54 thereof. As would also be apparent to one of ordinary skill in the art, during such operation of apparatus 20 a fluid stream 62 established in ion-concentrating compartment 22 receives ionic species from fluid in depleting compartment 24, and a concentrated fluid stream 64 is established exiting ion-concentrating compartment 22, and in particular second port 50 thereof. Depleted fluid stream 60 passes through flow reversal valves 128 and 130, output directing valve 132, and is directed to product selection valve 134. According to a first setting of product selection valve 134, depleted fluid stream 60 is directed to product recovery, and according to a second setting of valve 134, depleted fluid stream 60 is directed to drain 84.

During operation of apparatus 20, depleted fluid stream 60 exiting ion-depleting compartment 24 typically has an ionic concentration, specifically an ionic strength, lower than that of concentrated fluid stream 64 exiting ion-concentrating compartment 22. However, such need not be the case. For example, apparatus 20 may be used to remove certain ionic species from highly concentrated solutions such as fruit juice. In such a case the concentrated solution is established as fluid stream 58 in ion-depleting compartment 24, ionic species are removed, and a somewhat depleted product fluid stream 60 is recovered from ion-depleting compartment 24 which may have an ionic strength much higher than the ionic strength of fluid stream 64 recovered from ion-concentrating compartment 22. Thus, the electrodeionization apparatus of the present invention provides a net flow of ionic species out of ion-depleting compartment 24 and into ion-concentrating compartment 22, and the relative ionic concentrations of the fluid streams established within and recovered from concentrating compartment 22 and depleting compartment 24 are not important to the present invention.

As described above, according to a preferred embodiment of the invention, apparatus 20 is provided with first electrode compartment 36 and second electrode compartment 38. The compartments are supplied with an electrolyte for establishing electrical communication between electrodes 32 and 34 and the concentrating and depleting compartments of the apparatus. As illustrated, conduit 66 connects feed inlet 56 to electrode compartments 36 and 38. Electrolyte source 68 may be positioned in communication with conduit 66 so as to provide predetermined levels of electrolyte into the electrode compartments. Electrolyte valve 70 may be adjusted so as to control the electrolyte concentration in the fluid streams entering the electrode compartments. When normal to low-quality fluid is provided into feed inlet 56 and conduit 66 of apparatus 20, electrolyte source 68 may be unnecessary, or the apparatus may be operated with electrolyte valve 70 closed. Such normal to low-quality fluid typically has an ionic strength sufficient to establish adequate electrical communication between electrodes 32 and 34 and membranes 28 and 30, respectively, without auxiliary electrolyte. However, when particularly high-quality fluid is provided into feed inlet 56, that is, fluid having particularly low ionic strength, electrolyte valve 70 may be advantageously adjusted so as to introduce electrolyte from source 68 into conduit 66.

An electrolyte fluid stream enters electrode compartments 36 and 38 at first ports 72 and 74 thereof, respectively. Electrolyte exits electrode compartments 36 and 38 at second ports 76 and 78 thereof, respectively, and flows through valves 80 and 82. Valves 80 and 82 are adjusted so as to control the flow of electrolyte through electrode compartments 36 and 38, respectively, such that the hydrogen ion concentration in either electrode compartment, when that electrode is polarized as an anode, is maximized, while hydroxide ion concentration in the other electrode compartment, when that electrode is polarized as a cathode, is minimized. For example, if electrode 32 is polarized as an anode, and hydrogen ion is generated at electrode 32, valve 80 may be adjusted so as to minimize fluid flow through electrode compartment 36 housing electrode 32, such that hydrogen ion concentration is maximized. In this way, scaling at electrode 32 is counteracted. Similarly, when electrode 34 is polarized as a cathode, valve 82 may be adjusted so as to maximize flow of electrolyte through electrode compartment 38 so as to minimize hydroxide ion concentration therein, as hydroxide ions have been found to promote scaling. Additionally, according to such an arrangement, valve 82 may be adjusted so as to maximize flow of fluid through electrode compartment 38 as cations are removed from diluting compartment 24 into electrode compartment 34 during apparatus operation.

Valves 80 and 82 may be mechanical flow-controlling valves, pulse valves, or any mechanism for controlling the overall flow of electrolyte through electrode compartments 32 and 34. Additionally, valves 80 and 82 need not be positioned downstream from electrode compartments 36 and 38, but rather may be positioned upstream. According to the embodiment illustrated, valves 80 and 82 are positioned downstream from electrode compartments 36 and 38, respectively, and comprise pulse valves. For purposes of illustration of fluid flow through electrode compartments 36 and 38, a dotted line signifies pulsed flow. Such pulsed flow should be adjusted to provide net fluid flow through the electrolyte compartments sufficient to remove gas generated therein.

As illustrated, effluent from electrode compartments 36 and 38 is routed to drain 84. However, such effluent may be re-routed to conduit 66 so as to recirculate electrolyte through the electrode compartments, to fluid stream 62 entering concentrating compartment 22, to liquid/gas interface tank 86 (described below), to chemical/biological species source 88 (described below), or to another portion of apparatus 20, if appropriate. Alternatively, fluids routed to drain 84 could be directed to a recycle or re-use circuit that is not part of the apparatus of the present invention. Preferably, effluent from the electrode compartments is routed to drain 84 and discarded, as it is typically relatively high in hydroxide ion concentration. A plurality of drains are schematically illustrated in the figures, each designated by the numeral 84. It is to be understood that a single drain could be provided, discardable effluent being routed to the single drain from a variety of apparatus locations. Alternatively, any number of drains 84 may be provided, some or all of which may receive discardable effluent from various apparatus locations.

According to the invention, a novel recirculation flow path is established during certain steps of the polarity reversal protocol of the present invention, and this recirculation path is established in the first fluid circuit illustrated in FIG. 2. The recirculation path is arranged to recirculate fluid flow from port 50 of ion-concentrating compartment 22 to port 48 thereof. According to the step of the polarity reversal protocol illustrated in FIG. 2, fluid exits through port 50 of ion-concentrating compartment 22, passes through flow reversal valves 90 and 92, output directing valve 94, conduit 96 which connects valve 94 to liquid/gas interface tank 86, interface tank outlet 98, pump 100, conduit 102, and conduit 104 which connects conduit 102 with entrance 48 of ion-concentrating compartment 22, and re-enters concentrating compartment 22 through port 48. Conduit 104 also includes flow reversal valves 106 and 108. Pump 100 may be positioned at a variety of locations along the recirculation path, so long as it causes adequate fluid flow through the recirculation path.

Liquid/gas interface tank 86 provides for elimination of gas, generally carbon dioxide, generated in ion-concentrating compartment 22 of the electrodeionization apparatus. The liquid/gas interface tank 86 may take a variety of forms, so long as removal of adequate amounts of gas from the concentrated fluid stream 64 exiting ion-concentrating compartment 22 is achieved. For example, tank 86 may simply comprise a tank open to the atmosphere. Alternatively, tank 86 may be a closed system and may include a gas pressure control 110 provided so as to control the rate of evolution of gas from the fluid in tank 86. For example, gas pressure control 110 may be a vacuum pump adjusted so as to hasten removal of gas from liquid in tank 86. A sparger maybe used in place of or in combination with tank 86 to aid removal of gas from the fluid. Alternatively, a membrane degassifier may be used within the recirculation loop. Or a sterilizing grade filter may be used to remove gas from concentrated fluid stream 64 at liquid/gas interface tank 86. A sterilizing grade filter may also be used at other locations in the fluid circuitry of the present invention. For example, one or more sterilizing grade filters may be placed in conduits 104 and/or 105 so as to filter fluid provided into ion-concentrating compartment 22 and/or ion-depleting compartment 24.

The recirculation path includes at least one input and at least one output for introducing a desired chemical and/or biological species to the fluid stream, for introducing feed liquid or other relatively low ionic-concentration fluid into the recirculation path, and for removing overflow therefrom. A in this way, the ionic concentration of the fluid stream 62 entering ion-concentrating compartment 22 though conduit 104 may be controlled. According to the fluid circuit illustrated in FIG. 2, the recirculation path includes conduit 112, connecting feed inlet 56 with conduit 104, in fluid communication with concentrating compartment 22. The flow of fluid through conduit 112 may be controlled by valve 114. Additionally, the fluid circuit includes blowdown outlet 116, the flow of fluid into drain 84 through which may be controlled by blowdown valve 118. In this way, the recirculation path provides for conservation of fluid flowing through ion-depleting compartment 22 since the fluid is recirculated to re-enter the concentrating compartment. However, in connection with the recirculation, the ionic concentration of the fluid stream 62 entering the concentrating compartment 22 may be controlled by diluting the recirculation fluid path through make-up conduit 112 and removing overflow from the path through blowdown outlet 116. Such control of ionic concentration by opening valves 114 and 118 may be advantageous when the ionic strength of the fluid flowing through the recirculation path is particularly high. However, the ionic strength of such fluid is advantageously maintained at a level providing adequate ionic conductivity across concentrating compartment 22, and it is often advantageous to keep valves 114 and 118 closed to increase the ionic strength of fluid in concentrating compartment 22.

Figure 3:
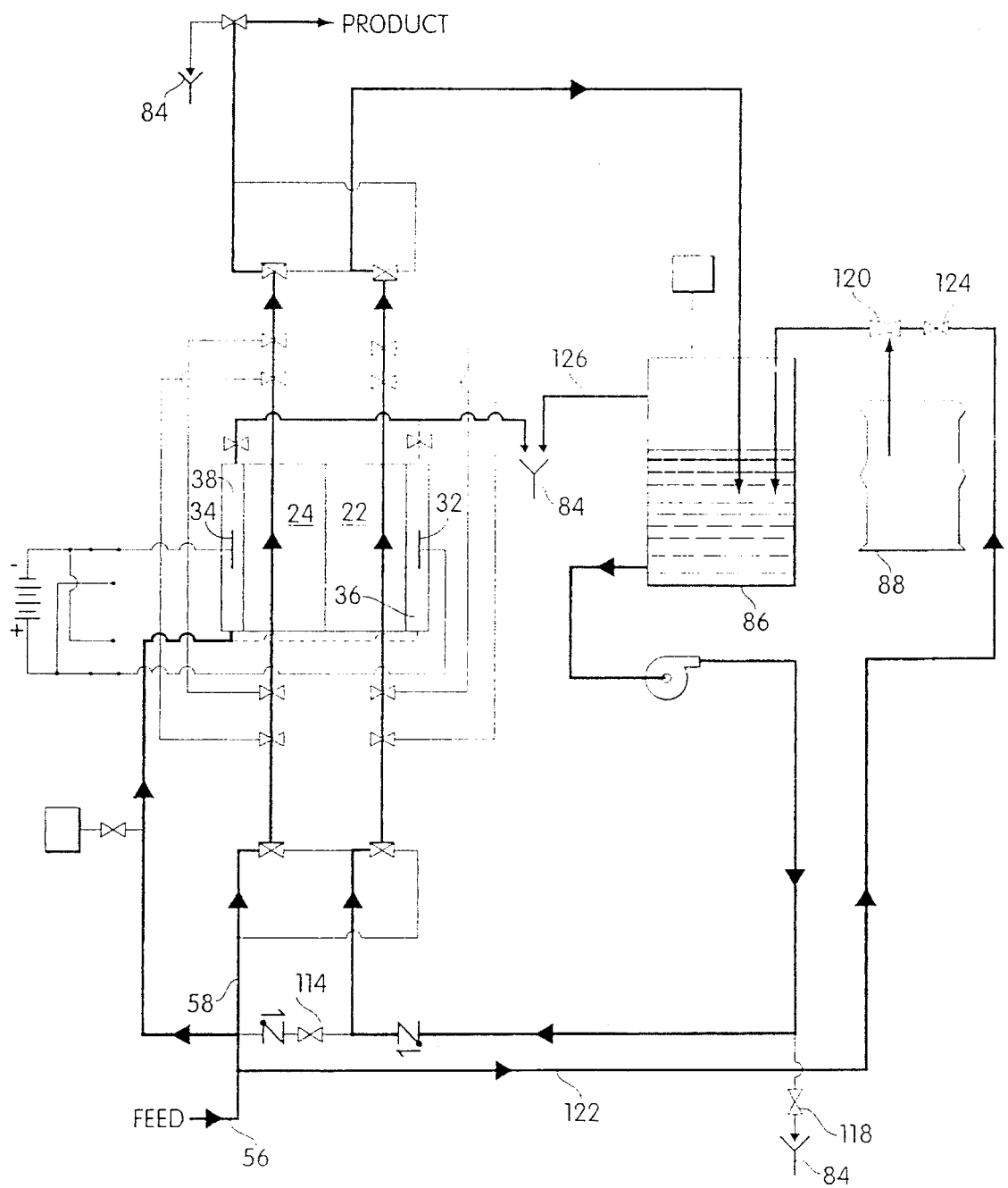
FIG. 3 is a schematic illustration of a preferred embodiment of the inventive apparatus adjusted so as to define a first fluid circuit including chemical/biological species control.

As noted above, chemical and/or biological parameters of the fluid stream entering ion-concentrating compartment 22, and in particular chemical or biological parameters within the recirculation path may be controlled. The implementation of such control is illustrated in FIG. 3, in which chemical and/or biological species are introduced from chemical/biological species source 88 into liquid/gas interface tank 86. Source 88 may take a variety of forms, such as a reservoir connected to liquid/gas interface tank 86 with a controlled delivery conduit including a pump or the like. As illustrated, source 88 takes the form of a reservoir addressed by venturi 120 through which flows fluid from feed inlet 56 via feed conduit 122. Chemical/biological species control valve 124 controls feed fluid flow through venturi 120, and feed conduit 122 continues through venturi 120 and feeds into liquid/gas interface tank 86. Thus, when apparatus 20 is operational and control valve 124 is open, feed fluid flows through venturi 120, drawing chemical and/or biological species from source 88 and introducing the species into tank 86. Source 88 need not provide species directly into tank 86, as illustrated, but may provide such species at any location so as to introduce such species into fluid stream 62 connected to ion-concentrating compartment 22. Chemical and/or biological species from source 88 may be introduced into fluid stream 62 via a pump, via gravity, or other known methods.

During the introduction of chemical and/or biological species into the recirculation path from source 88, it may be advantageous to maximize the concentration of such species in the recirculation path. Thus, make-up valve 114 and blowdown valve 118 may be closed during this step, so that the recirculation path becomes a closed circuit with the exception of the introduction of the species from source 88. As can be seen in FIG. 3, such introduction will result in a net increase in fluid content in liquid/gas interface tank 86. Therefore, when the level of fluid in tank 86 reaches a predetermined level, fluid may exit tank 86 through overflow 126 into drain 84.

Source 88 may contain a variety of chemical and/or biological species. For example, source 88 may contain bacteria selected to degrade particular species present in the recirculation path or generated as a result of the ion-concentrating function of compartment 22. The source 88 may, alternatively contain anti-bacterial agents for removal of bacteria from the recirculation path. Source 88 may also contain sanitizing chemical agents such as peracetic acid, sodium percarbonate, and the like. Additionally, other cleaning agents such as alkaline brine, brine, acid, caustic chemical species, and the like may be contained in source 88. Any agents provided from source 88 may optionally be adjusted to a desired temperature prior to addition into fluid stream 62.

In still another embodiment source 88 may include chemical species such as non-scaling species. As used herein, the term "non-scaling species" is meant to define species, typically inorganic salts, comprised of cations and anions which have a low tendency to cause precipitation from aqueous solution. The term "scaling species", as used herein, is meant to define species, typically inorganic salts, comprised of cations and anions, either or both of which tend to cause precipitation from aqueous solution. According to a preferred embodiment of the present invention, source 88 contains a concentrated solution of sodium chloride. According to the polarity reversal protocol step illustrated in FIG. 2 in which a portion of the fluid stream 62 entering ion-concentrating compartment 22 is fed by feed source 56, scaling ions such as calcium, magnesium, carbonate, and hydroxide are typically fed into ion-concentrating compartment 22 from feed inlet 56 when average to low-quality feed fluid is used, and may facilitate precipitation, hence scaling.

According to a preferred embodiment, in the step illustrated in FIG. 3 concentrated sodium chloride as a non-scaling species is introduced from source 88 into the recirculation path, and overflow is removed at 126. Once sufficient quantities of chemical and/or biological species from source 88 are introduced into the recirculation flow path (i.e., once the concentration of such species in the recirculation flow path is adjusted to a desired level), it is often advantageous to terminate introduction of such species from source 88 and to recirculate fluid through ion-concentrating compartment 22 in an isolated recirculation path for a period of time sufficient to assure establishment of a predetermined equilibrium within the recirculation path. For example, recirculation may continue until an equilibrium in which non-scaling species predominate over scaling species in the ion-exchange resin bed in compartment 22 is established.

Additionally, recirculation may continue until an equilibrium is established in which electrical resistance imbalance within and among the various ion-depleting and ion-concentrating compartments is minimized. For example, recirculation may continue until species resulting in relatively high electrical resistance are removed from ion-concentrating compartments. In particular, it is advantageous to establish an equilibrium in which, for example, sodium and chloride ion predominate over species such as carbonate, carbonic acid, slowly diffusing organics, and multivalent ions. An advantage associated with establishment of an equilibrium within the recirculation path in which electrical resistance is minimized is that electric current flows more freely across the compartments when a constant voltage electrical source is utilized. This results in minimization of pH shifting during polarity transition which, in turn, results in faster time-to-quality after polarity reversal. Furthermore, addition of relatively low electrical resistance species such as sodium and chloride into any or all of the ion-depleting and/or ion-concentrating compartments results in an electrical conductivity balance between the anion-exchange resin and cation-exchange resin within the compartment or compartments. This also minimizes pH shifting during polarity transition.

The isolated recirculation arrangement described above is illustrated in FIG. 4, in which make-up valve 114, blowdown valve 118, and chemical/biological species control valve 124 are all closed. In that case, an isolated recirculation path is established which includes ion-concentrating compartment 22, port 50 thereof, flow reversal valves 90 and 92, output directing valve 94, conduit 96, liquid/gas interface tank 86, interface tank outlet 98, pump 100, conduit 102, conduit 104, flow reversal valves 106 and 108 and port 48 of ion-concentrating compartment 22. When concentrated sodium chloride is introduced into the recirculation path during the step illustrated in FIG. 3, and the recirculation path is isolated for a period of time as illustrated in FIG. 4, the mixed ion-exchange resin bed in ion-concentrating compartment 22 may be regenerated from a scaling form, that is, a calcium, magnesium, and/or carbonate or hydroxide form, to a non-scaling form, that is, sodium and chloride form.

Figure 4:
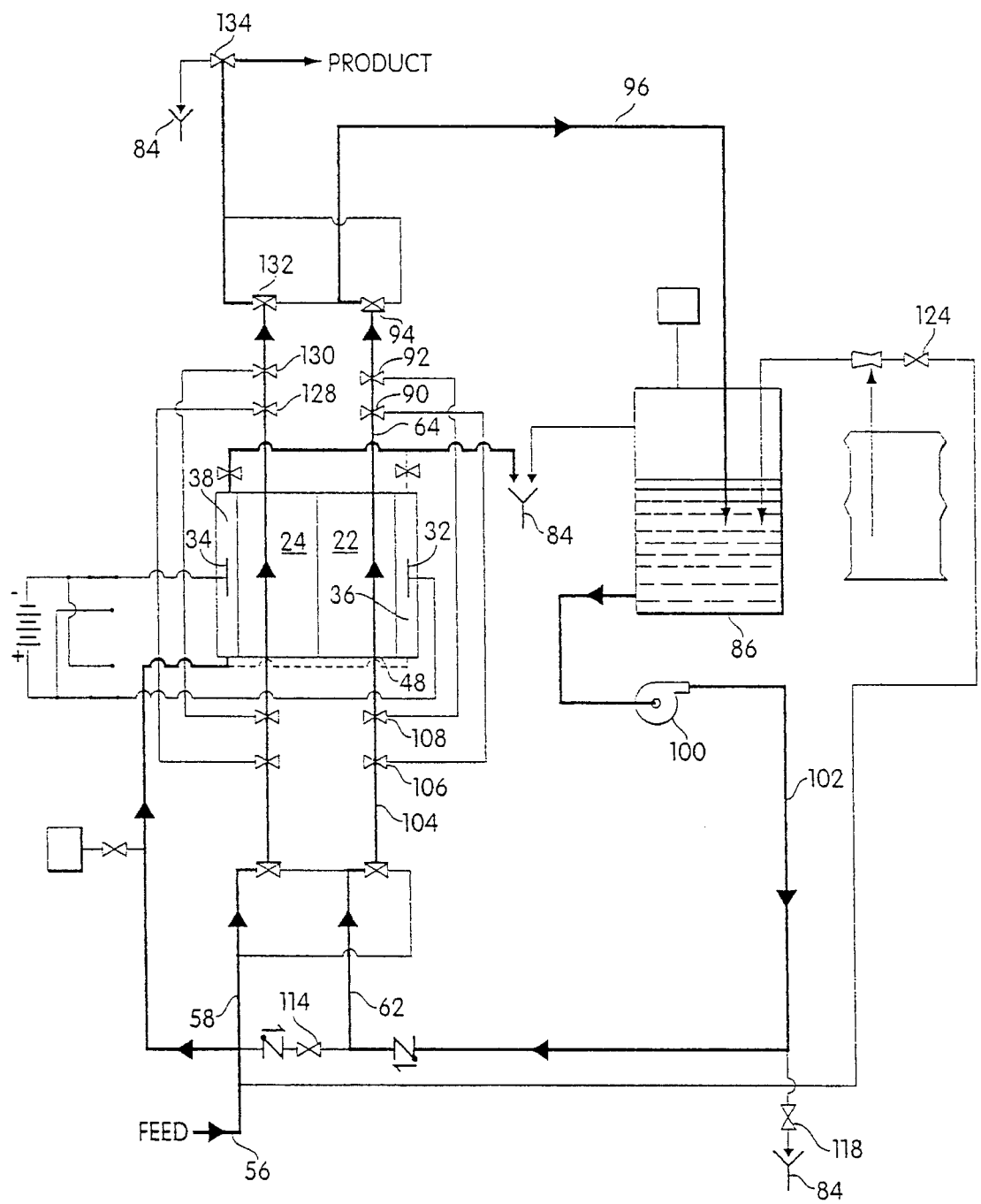
FIG. 4 is a schematic illustration of a preferred embodiment of the inventive apparatus adjusted so as to define a first fluid circuit including an isolated recirculation path.

As illustrated thus far with reference to FIGS. 2–4, a first fluid circuit of the present invention is illustrated which connects the source of a first fluid stream 62 having a first ionic concentration to ion-concentrating compartment 22, and connects the source of a second fluid stream 58 having a second ionic concentration to ion-depleting compartment 24. According to the invention, the ionic concentration of fluid stream 62 will generally, but not necessarily, be higher than that of second fluid stream 58. When electrodes 32 and 34 are energized, a depleted fluid stream 60 is established exiting the ion-depleting compartment 22 and having a third ionic concentration, and a concentrated fluid stream 64 is established exiting ion-concentrating compartment 22 having a fourth ionic concentration. The fourth ionic concentration of concentrated fluid stream 64 generally is, but not necessarily, higher than the third ionic concentration of depleted fluid stream 60, due to the purification of the fluid in ion-depleting compartment 24 of the electrodeionization apparatus.

Figure 5:
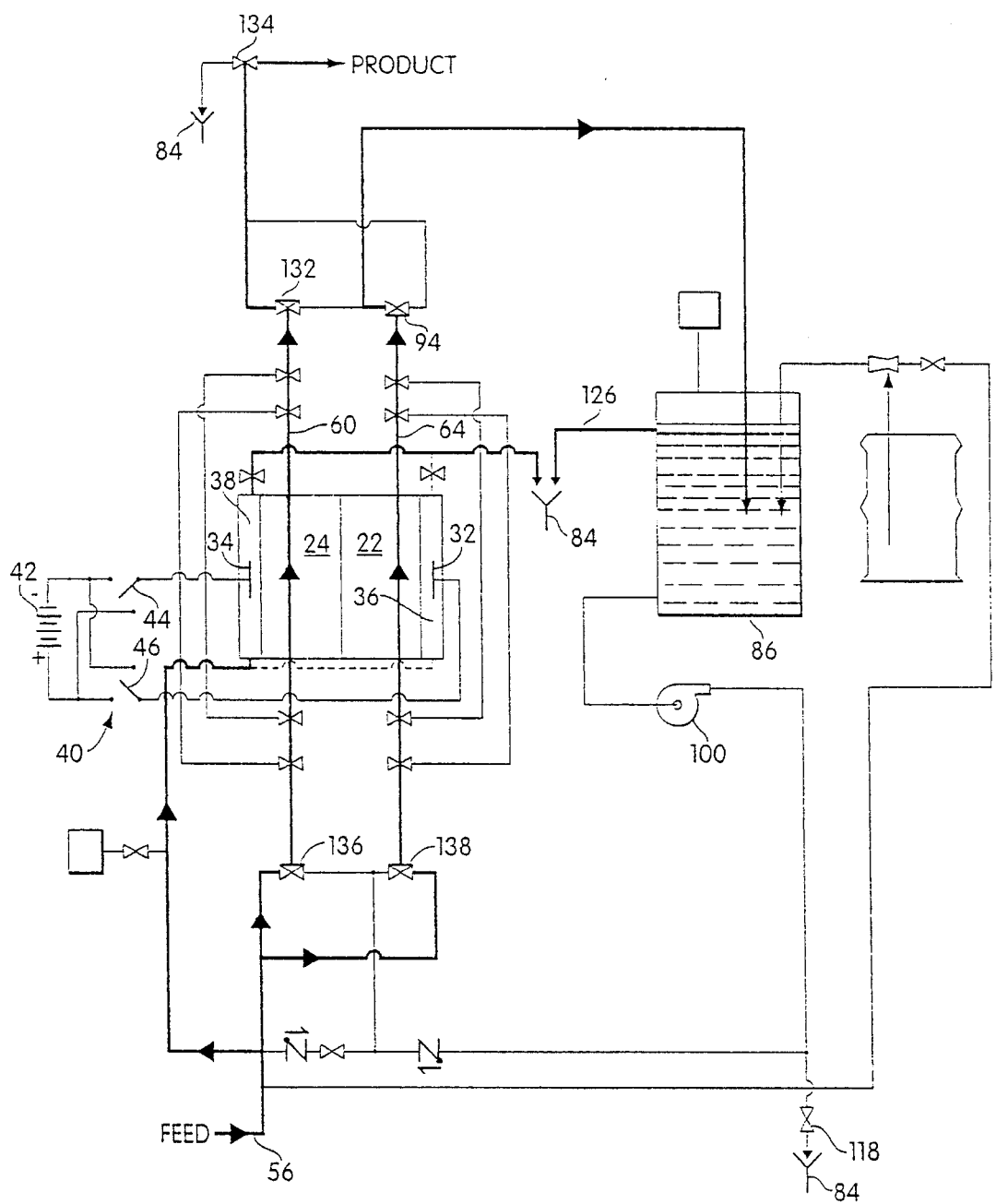
FIG. 5 is a schematic illustration of a preferred embodiment of the inventive apparatus adjusted so as to define a second fluid circuit, with first and second electrode de-energized.

Next, a substitution step useful in connection with the polarity reversal protocol will be described. The substitution step is effected through a second fluid circuit in which the connection between fluid stream 58 and ion-depleting compartment 24 is maintained, while the connection between fluid stream 62 feeding ion-concentrating compartment 22 is broken and a fluid stream having an ionic concentration lower than that of fluid stream 62 is connected to ion-concentrating compartment 22. Referring to FIG. 5, a preferred embodiment of a second fluid circuit of the present invention is illustrated in which a single fluid stream source, that is, feed inlet 56, is connected to both ion-concentrating compartment 22 and ion-depleting compartment 24. This is effected by stopping pump 100 and setting feed directing valves 136 and 138 so as to direct feed fluid into both ion-concentrating compartment 22 and ion-depleting compartment 24. The settings of output directing valves 94 and 132 and product selecting valve 134 do not change, thus depleted fluid stream 60 remains directed to product collection, and concentrated fluid stream 64 remains directed to gas/liquid interface tank 86. As is apparent, a net input of fluid into tank 86 exists, and tank 86 overflows through overflow 126 into drain 84.

In this way, after ion-concentrating compartment 22 has been regenerated to a non-scaling and/or lower resistance form as described above with reference to FIGS. 3 and 4, it is flushed with feed fluid of lower ionic strength in preparation for service as a second ion-depleting compartment, as described below. Additionally, tank 86 may be allowed to overflow, diluting the concentration of scaling ions present as a result of their displacement from ion-concentrating compartment 22 during the chemical input and recirculation step illustrated in FIGS. 3 and 4.

During the substitution step of the present invention, electrodes 32 and 34 may be de-energized. This is illustrated in FIG. 5 by the disconnection of electrical switches 44 and 46. During operation of apparatus 20, when a positive polarity is applied to electrode 32 and a negative polarity is applied to electrode 34, water splitting may occur in the ion-depleting compartment 24. Such water splitting may occur when the potential difference at resin and membrane surfaces is greater than 0.83 volts, resulting in the generation of $H^+$ and $OH^-$ ions in fluid in the depleting compartments. If the ratio of concentration of $H^+$ and $OH^-$ to other cations and anions in the ion-depleting compartments is sufficient, and continues for an adequate period of time, this results in establishment of the mixed ion-exchange bed in the ion-depleting compartments in the $H^+$ and $OH^-$ form. Thus, when electrodes 32 and 34 are de-energized, as illustrated in FIG. 5, ion-depleting compartment 24 continues to produce a high-quality depleted fluid stream 60 via conventional ion-exchange in the ion-depleting compartment, as long as the ion-exchange bed in compartment 24 is in a substantially $H^+$ and $OH^-$ form. This de-energized arrangement causes migration of ions into concentrating compartment 22 to cease, lowering the ionic concentration of fluid therein in preparation for service by compartment 22 as a second ion-depleting compartment, and conserving electrical power.

Figure 6:
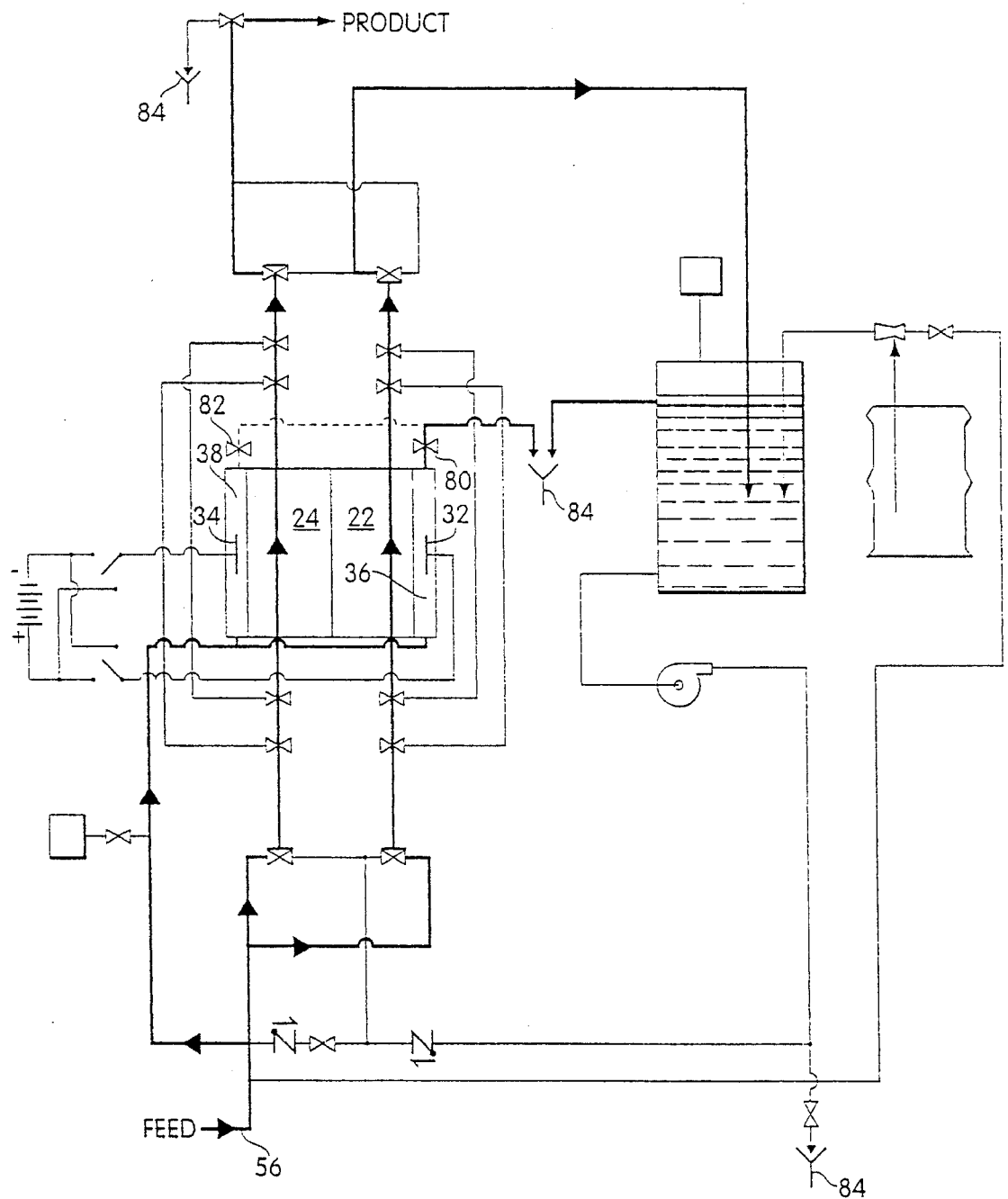
FIG. 6 is a schematic illustration of a preferred embodiment of the inventive apparatus adjusted so as to define a second fluid circuit, with the relative rates of electrolyte flow through first and second electrode compartments reversed.

Next, as illustrated in FIG. 6, the flow of electrolyte through first electrode compartment 36 is converted from a restricted, or pulsed state to a free-flowing state and the flow of the electrolyte through second electrode compartment 38 is converted from a free-flowing state to a restricted, or pulsed state. This is effected by adjusting electrolyte flow valves 80 and 82, and is done in preparation for establishment of electrode 32 as a cathode and establishment of electrode 34 as an anode, as described below.

Figure 7:
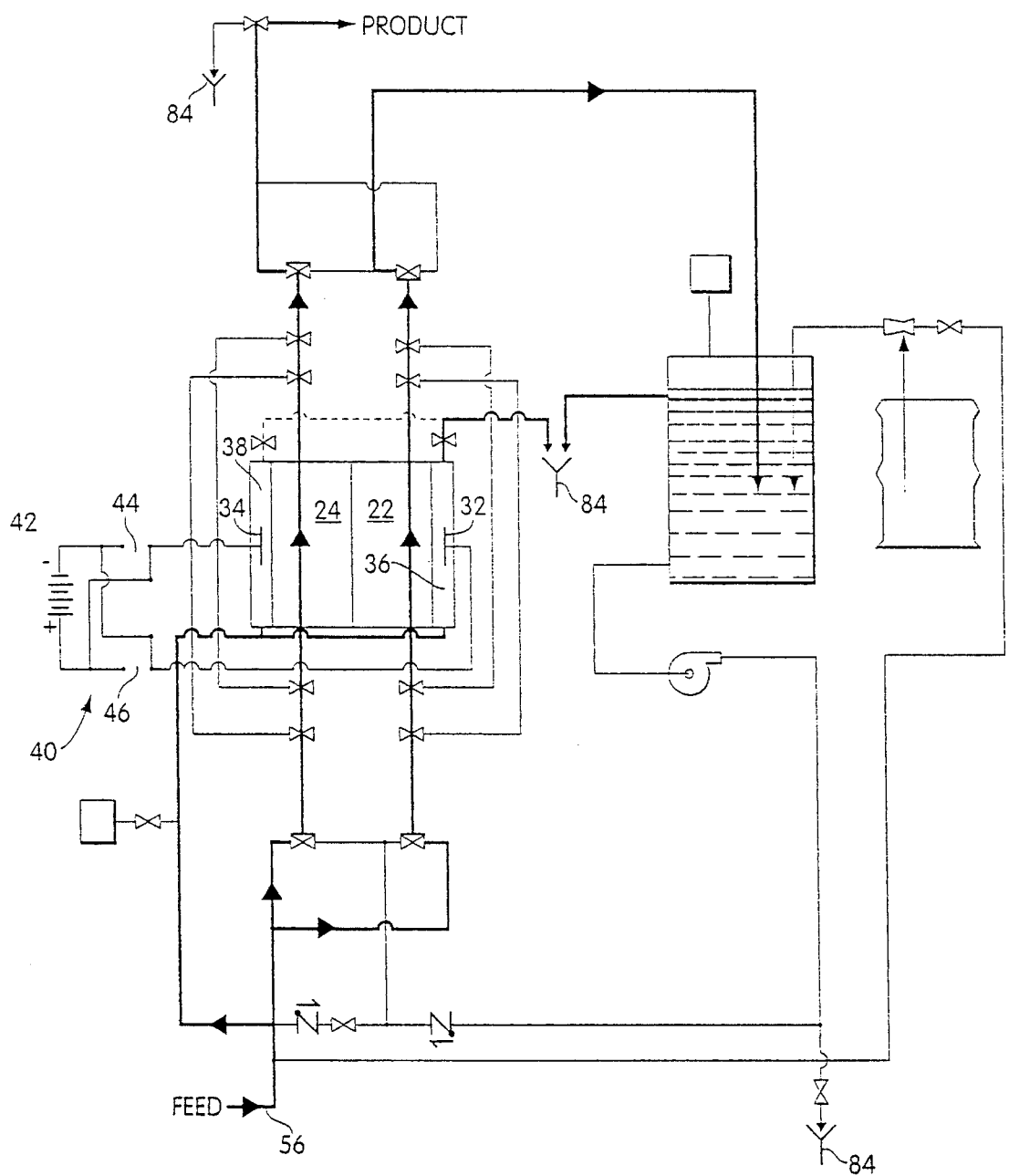
FIG. 7 is a schematic illustration of a preferred embodiment of the inventive apparatus adjusted so as to define a second fluid circuit, with reversed polarity applied to the first and second electrodes.

Now, with reference to FIG. 7, switches 44 and 46 of electric circuit 40 are positioned so as to apply a negative polarity to first electrode 32 and a positive polarity to second electrode 34, that is, the polarity of the electrodes is reversed from the polarity established according to the recirculation step as described above. This arrangement is provided while, and endures only so long as, the ion-exchange bed in compartment 24 is in a $H^+$ and $OH^-$ form sufficient to allow compartment 24 to provide high-quality depleted fluid product. The reversed polarity of the electrodes causes anions to be driven from compartment 22 through anion-permeable membrane 26 into compartment 24, and cations to be driven through cation-permeable membrane 28 into electrode compartment 36. In this way, the ionic strength of fluid in compartment 22 is minimized, in preparation for service by compartment 22 as a second ion-depleting compartment, as described below with reference to FIG. 8.

In the preferred embodiment illustrated, polarity reversal of the electrodes is effected subsequent to the substituting step described above with reference to FIG. 5, in which the electrodes are de-energized. However, the reversal of polarity of the electrodes may be effected during the substituting step, without de-energizing the electrodes. Referring to FIG. 5, this would be represented by adjustment of switches 44 and 46 so as to connect the positive pole of source 42 to electrode 34, and the negative pole of source 42 to electrode 32. Thus, the electrodes need not be de-energized during any step of the inventive polarity reversal protocol. According to such an embodiment, but one switch would be required in electric circuit 40.

Figure 8:
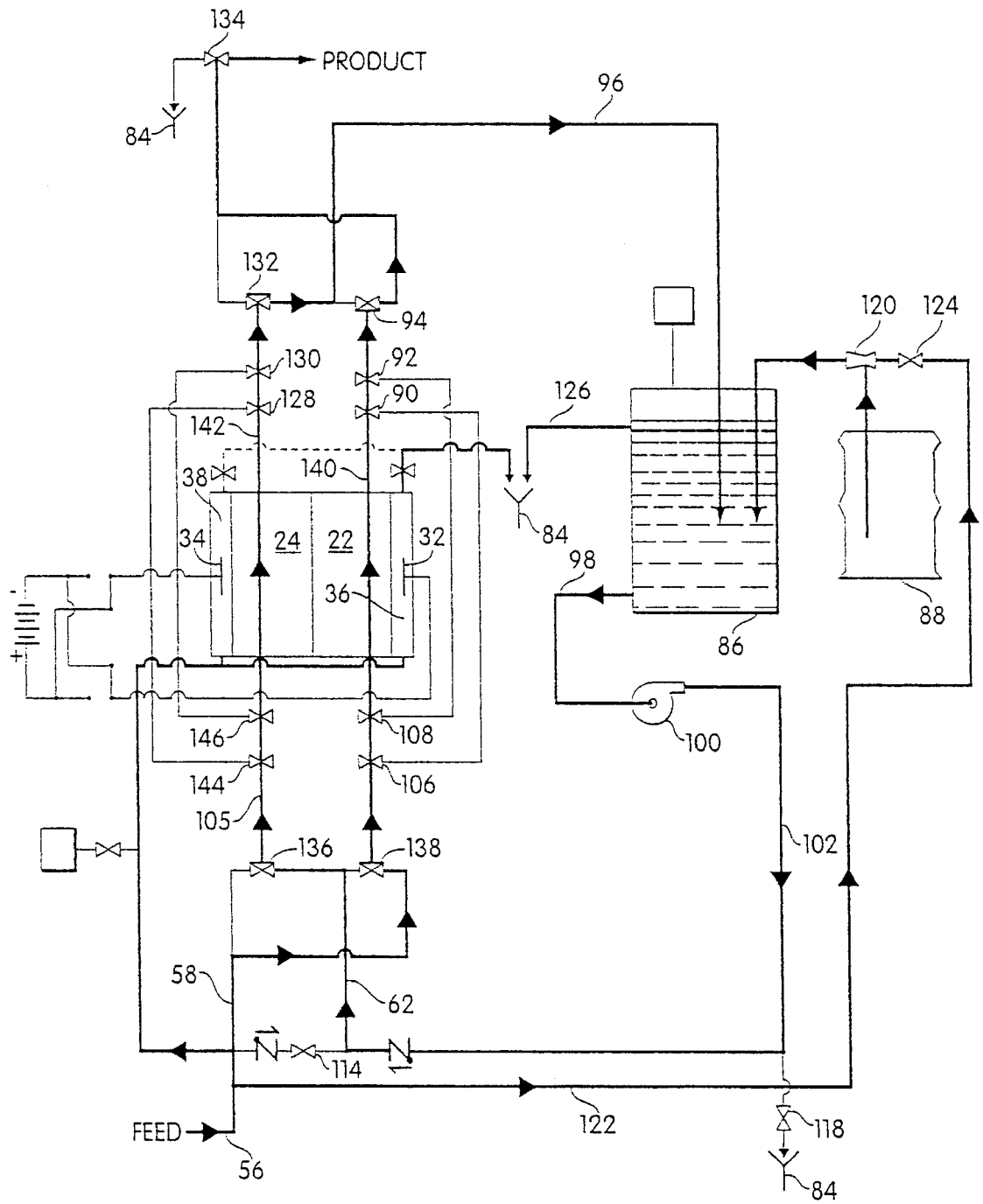
FIG. 8 is a schematic illustration of a preferred embodiment of the inventive apparatus adjusted so as to define a reversed first fluid circuit, including chemical/biological species control.

Following the substituting step described above, ion-concentrating compartment 22 is converted to a second ion-depleting compartment and ion-depleting compartment 24 is converted to a second ion-concentrating compartment. With reference to FIG. 8, this is established by reversing the polarity of electrodes 32 and 34 such that a negative polarity is applied to first electrode 32 and a positive polarity is applied to second electrode 34, if this has not already been done during or subsequent to the substituting step, and establishing the first fluid stream 62 having the first ionic concentration through the second ion-concentrating compartment 24 and establishing the second fluid stream 58 having the second ionic concentration through the second ion-depleting compartment 22. In this way, a depleted fluid stream 140 is established exiting the second ion-depleting compartment 22 and a concentrated fluid stream is recirculated. Specifically, output directing valve 132 is switched so that concentrated fluid stream 142 is established exiting the second ion-concentrating compartment 24. As in the step described above with reference to FIG. 3, the concentrated fluid stream is recirculated. Specifically, output directing valve 132 is switched so that concentrated fluid stream 142 is recirculated through conduit 96, tank 86, pump 100, conduit 102, and conduit 105 to be established as first fluid stream 62 entering second ion-concentrating compartment 24.

This converting step is effected by adjusting apparatus 20 to define a fourth fluid circuit in which feed directing valve 136 is set so as to direct first fluid stream 62 through flow reversal valves 144 and 146 into second ion-concentrating compartment 24, and feed directing valve 138 is set so as to direct second fluid stream (feed fluid stream) 58 through flow reversal valves 106 and 108 into second ion-depleting compartment 22. Depleted fluid stream 140 exits second ion-depleting compartment 22, passes through flow reversal valves 90 and 92, and is directed by output directing valve 94 to product selecting valve 134 where it may be directed to product collection, as illustrated. Concentrated fluid stream 142 exits second ion-concentrating compartment 24, passes through flow reversal valves 128 and 130, and is directed by output directing valve 132 through conduit 96 and into liquid/gas interface tank 86 as described.

As illustrated in FIG. 8, the converting step includes directing the feed fluid through conduit 122 and chemical/biological species control valve 124 so as to draw chemical and/or biological species from source 88 through venturi 120 and into liquid/gas interface tank 86, in a manner similar to the step illustrated in FIG. 3. Overflow from tank 86 may be removed from overflow 126 to drain 84.

It is an advantage at many stages of the inventive polarity reversal protocol that resistance across any ion-depleting or ion-concentrating compartment is minimized. For example, as described above with reference to FIGS. 3 and 4, an equilibrium is advantageously established within ion-concentrating compartment 22 that favors lower resistance. An advantage of such a lower resistance state within concentrating compartment 22 is that, after the converting step described above with reference to FIG. 8 takes place, the more highly conductive salts in compartment 22 that are not immobilized on ion-exchange resin are more easily transferred across ion-permeable membrane 26 into second ion-concentrating compartment 24, and across resin filling the compartments. This provides better time-to-quality after polarity reversal. Another advantage is that more highly conductive salts are immobilized on ion-exchange resin within compartment 22, minimizing electrical resistance across that compartment.

Figure 9:
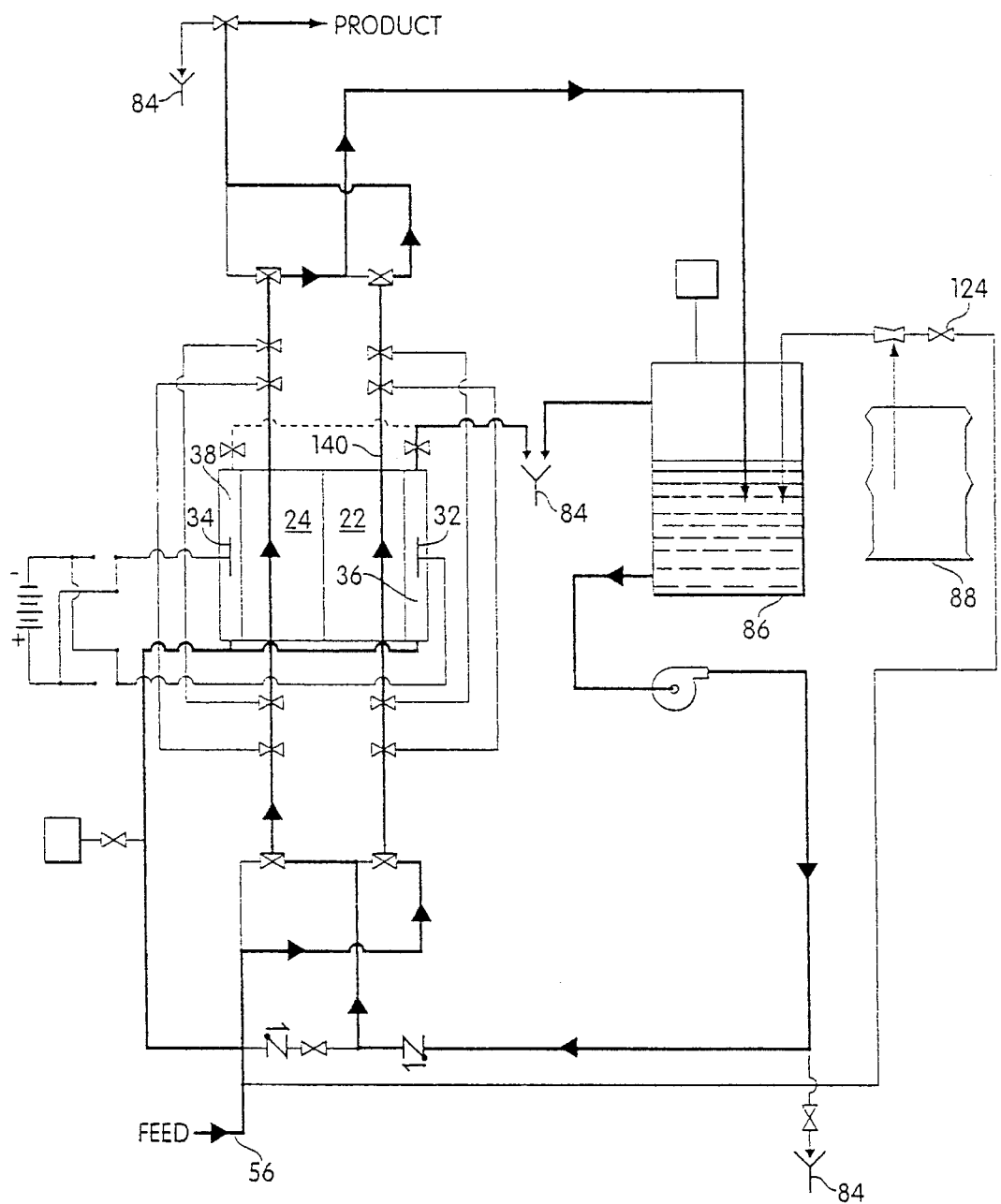
FIG. 9 is a schematic illustration of a preferred embodiment of the inventive apparatus adjusted so as to define a reversed first fluid circuit including an isolated recirculation path.

Next, with reference to FIG. 9, chemical/biological species control valve 124 is closed to halt introduction of species from source 88 into tank 86, and an isolated recirculation flow path through second ion-concentrating compartment 24 is established, in a manner similar to the step illustrated in FIG. 4. Then, with reference to FIG. 10, make-up valve 114 and blowdown valve 118 may be opened so as to connect feed inlet 56 to fluid stream 62 via make-up conduit 112 to provide continual dilution to the recirculation flow stream. Blowdown outlet 116 removes excess fluid from the recirculation flow stream.

A complete one-half cycle of the novel polarity reversal protocol of the present invention has been described with reference to FIGS. 2–9. In the first one-half cycle of the protocol, the first fluid circuit illustrated in FIG. 2 functions as a first long-term operational mode. According to this mode, recirculation through ion-concentrating compartment 22 is established with dilution from make-up conduit 112 and blowdown through blowdown outlet 26. The term "long-term operational mode" is meant to define a mode which is best suited for continual recovery of a depleted product from apparatus 20 for an extensive time period, i.e., hours or days. Although during the steps illustrated in FIGS. 3–9 high-quality depleted product is continuously recovered, these steps are generally short-term, intermediary steps in the novel polarity reversal protocol.

Figure 10:
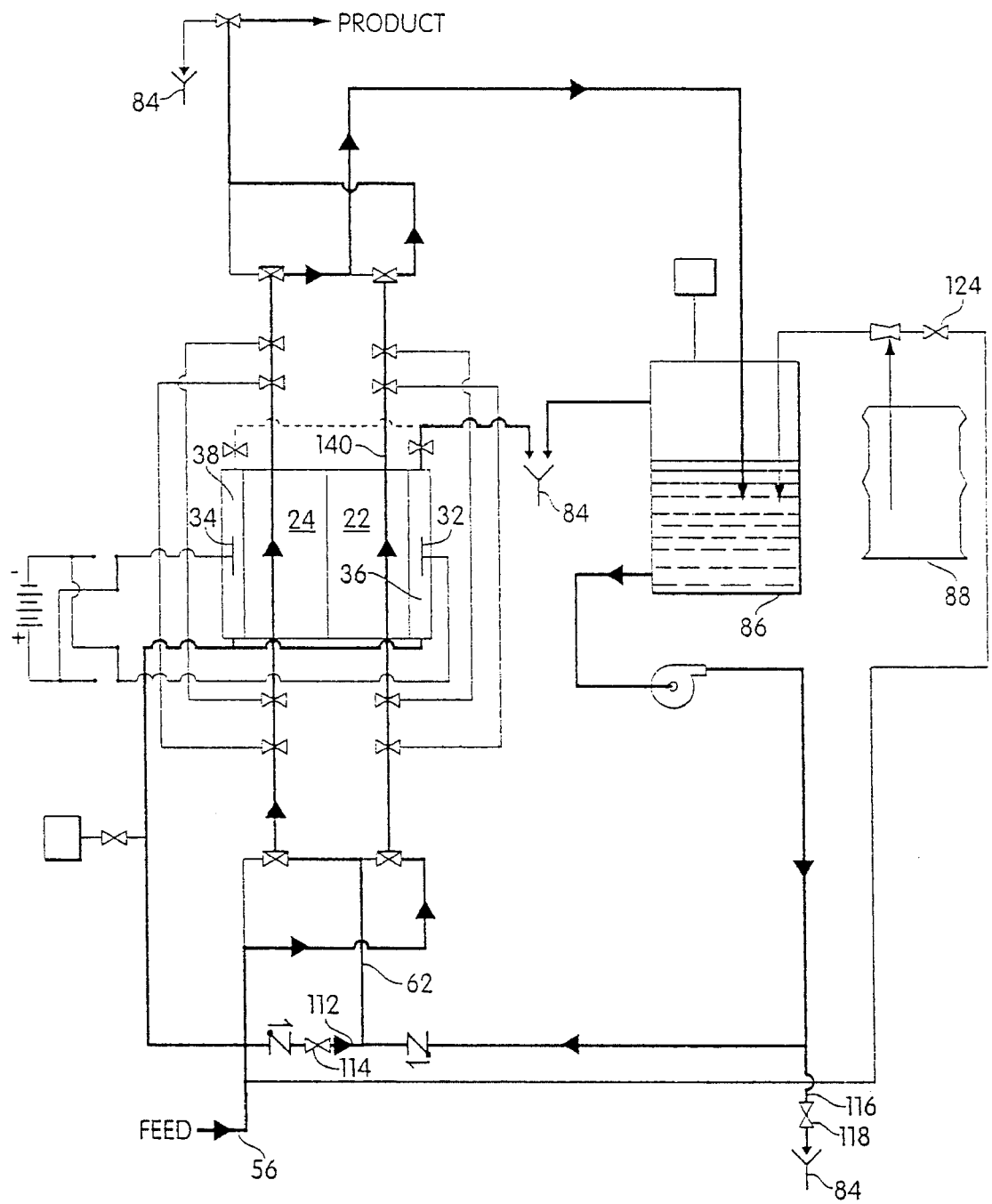
FIG. 10 is a schematic illustration of a preferred embodiment of the inventive apparatus adjusted so as to define a reversed first fluid circuit with recirculation path dilution.

As can be seen from the illustrations, the fourth fluid circuit illustrated in FIG. 10 also defines a long-term operational mode, as it is operationally identical to the first fluid circuit illustrated in FIG. 2, with the only exception that compartments 22 and 24 have been reversed in terms of ion-concentrating and ion-depleting functions.

Subsequently, the second half of the cycle may be carried out in a manner similar to or identical to the first one-half cycle, described above, but from a second perspective in which compartment 22 is an ion-depleting compartment and compartment 24 is an ion-concentrating compartment.

Figure 11:
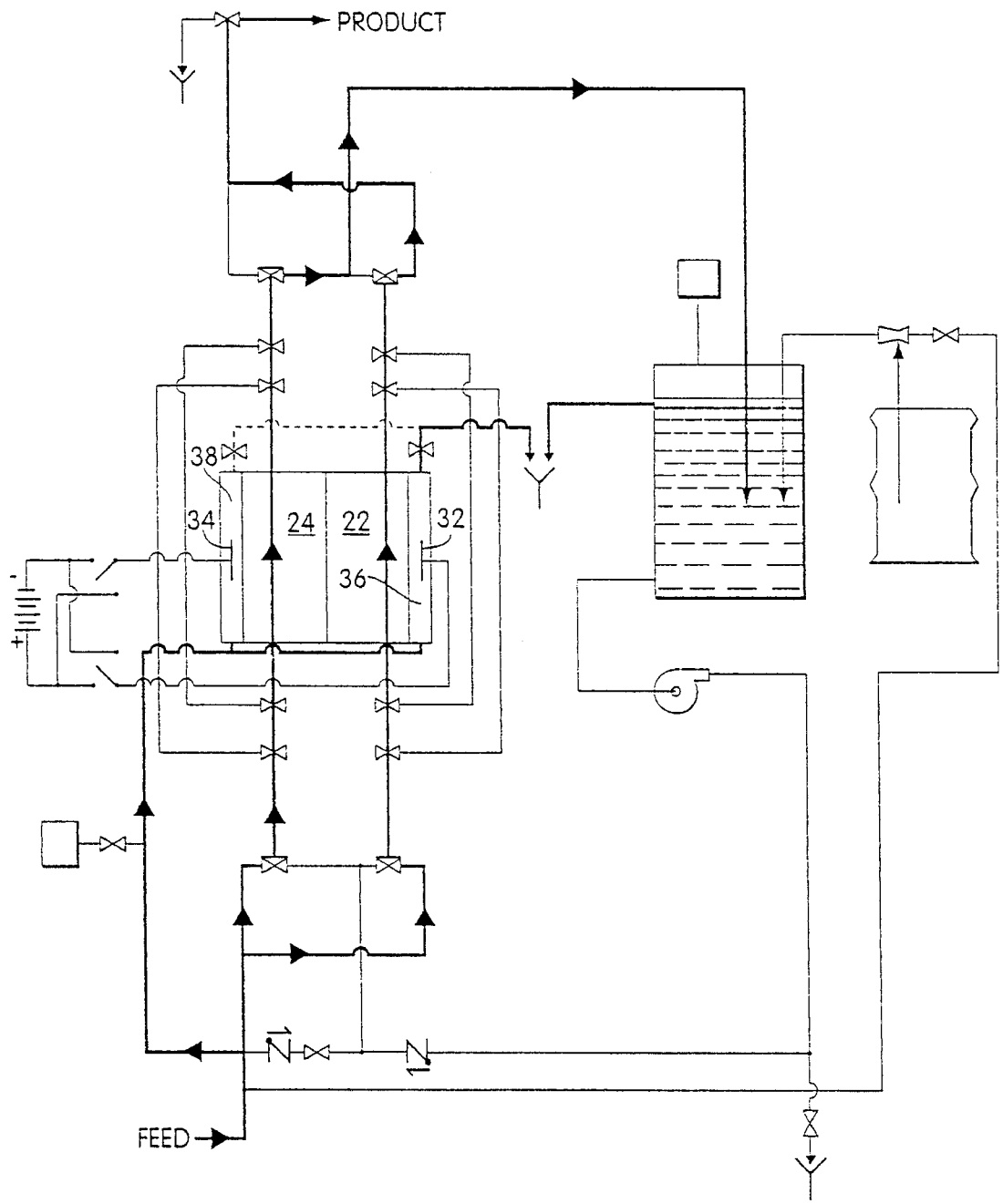
FIG. 11 is a schematic illustration of a preferred embodiment of the inventive apparatus adjusted so as to define a reversed second fluid circuit, with first and second electrodes de-energized.
Figure 12:
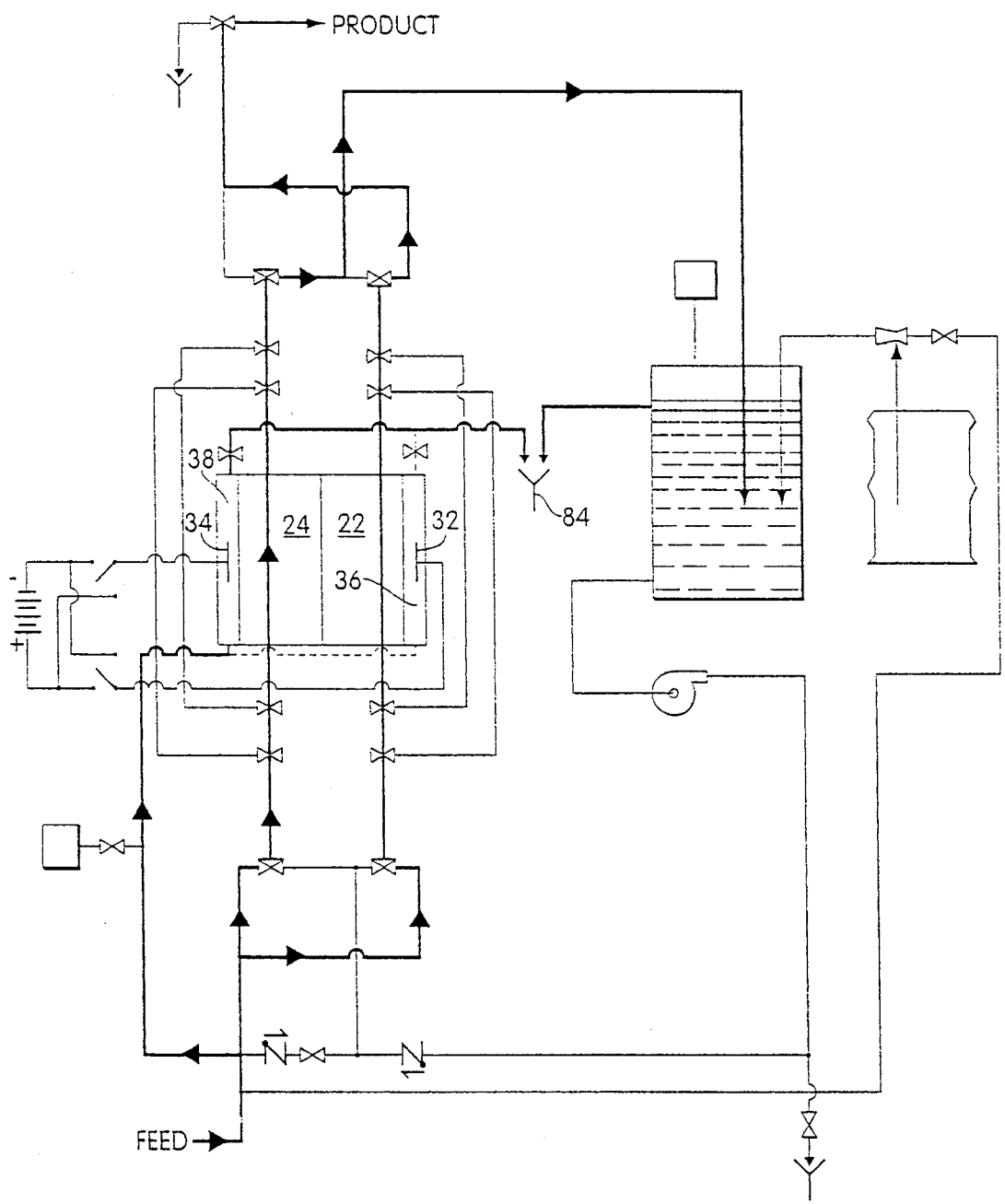
FIG. 12 is a schematic illustration of a preferred embodiment of the inventive apparatus adjusted so as to define a reversed second fluid circuit, with the relative rates of electrolyte flow through first and second electrode compartments reversed.
Figure 13:
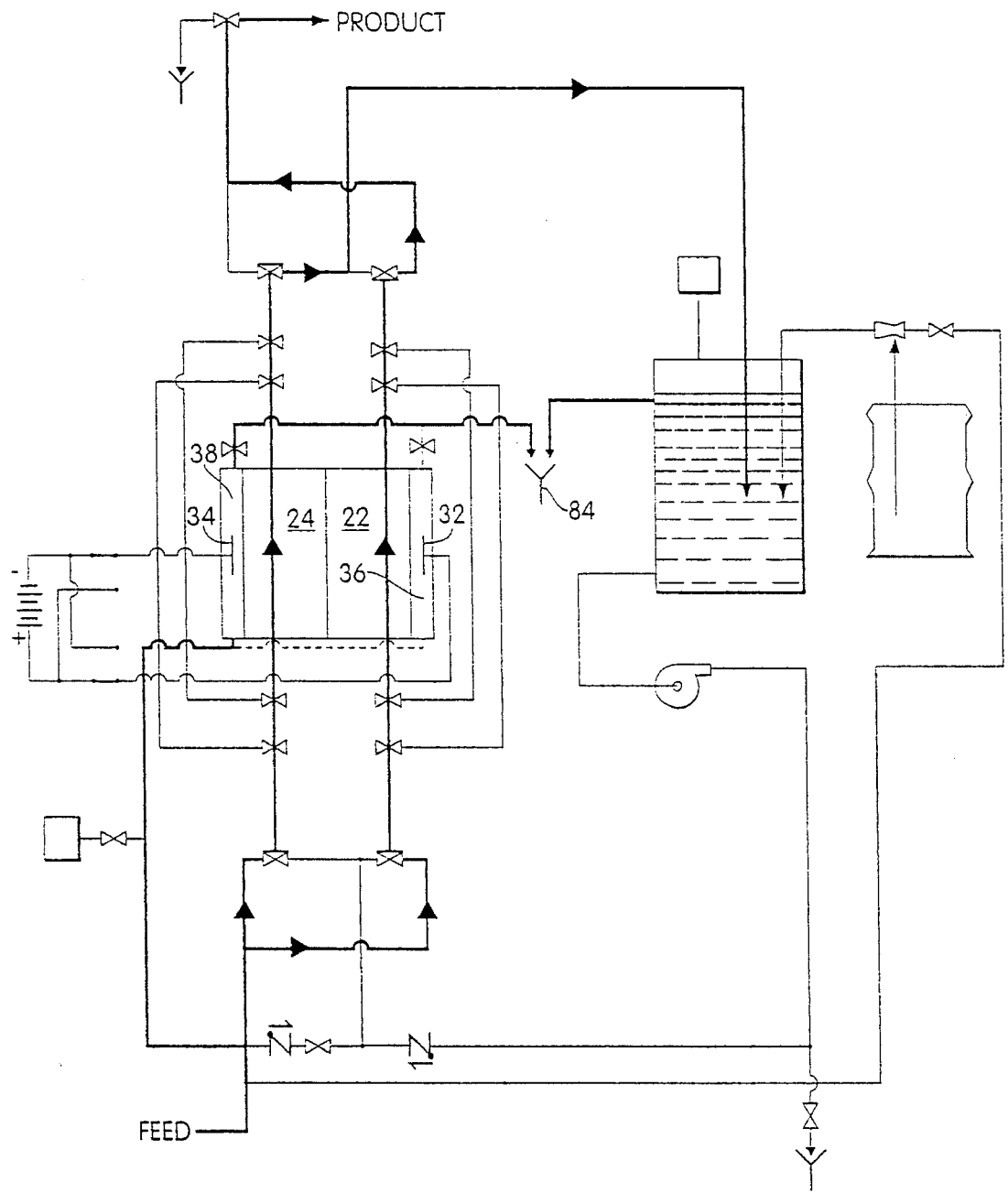
FIG. 13 is a schematic illustration of a preferred embodiment of the inventive apparatus adjusted so as to define a reversed second fluid circuit, with the original polarity of the first fluid circuit applied to the electrode.

The second half of the inventive polarity reversal protocol is analogous to the steps described above with reference to FIGS. 3–9, and will be described briefly. Following the step illustrated in FIG. 10 defining the second long-term operational mode, make-up valve 114 and blowdown valve 118 may be closed, and chemical/biological species control valve 124 may be opened so as to introduce chemical and/or biological species from source 88 into tank 86. This arrangement is illustrated in FIG. 8. Subsequently, valve 124 may be closed so as to establish an isolated recirculation flow path, as illustrated in FIG. 9, which differs from the long term operational mode illustrated in FIG. 10 in that make-up valve 114 and blowdown valve 118 are closed, and the isolated recirculation flow path increases in overall ionic strength due to the migration of ions from second ion-depleting compartment 22 to second ion-concentrating compartment 24. Then, a substituting step, analogous to that described above with respect to FIG. 5 may be effected, and this is illustrated in FIG. 11, with electrodes 32 and 34 de-energized. With reference to FIG. 12, electrolyte flow through electrode compartments 36 and 38 is re-adjusted so as to provide continuous flow through compartment 38 and pulsed or otherwise restricted flow through compartment 36. Subsequently, a positive polarity may be applied to electrode 32 and a negative polarity may be applied to electrode 34, as illustrated in FIG. 13. With reference to FIG. 3, a second converting step is effected in which compartment 22 is converted from a second ion-depleting compartment to an ion-concentrating compartment, and compartment 24 is converted from a second ion-concentrating compartment to an ion-depleting compartment, while valve 124 is opened so as to draw species from source 88 into tank 86. Valve 124 may then be closed, as illustrated in FIG. 4, to isolate a recirculation flow path through ion-concentrating compartment 22, followed by the opening of valves 114 and 118 to provide dilution and blowdown to the recirculation path, and the second half of the protocol is complete, arriving at the first long-term operational mode illustrated in FIG. 2, and completing the second half of the polarity reversal protocol.

Figure 14:
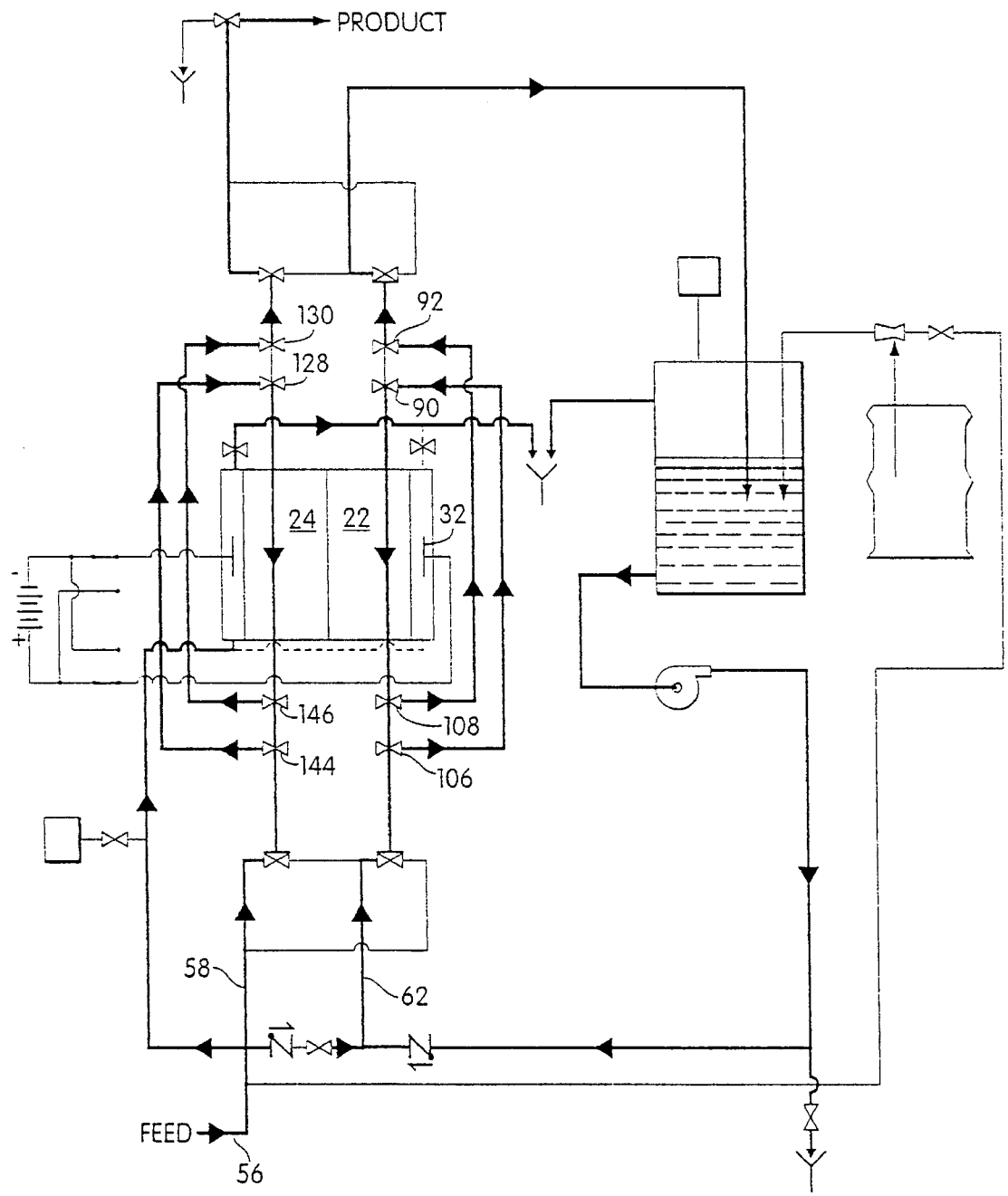
FIG. 14 is a schematic illustration of a preferred embodiment of the inventive apparatus adjusted so as to define a reversed-flow first fluid circuit.
Figure 15:
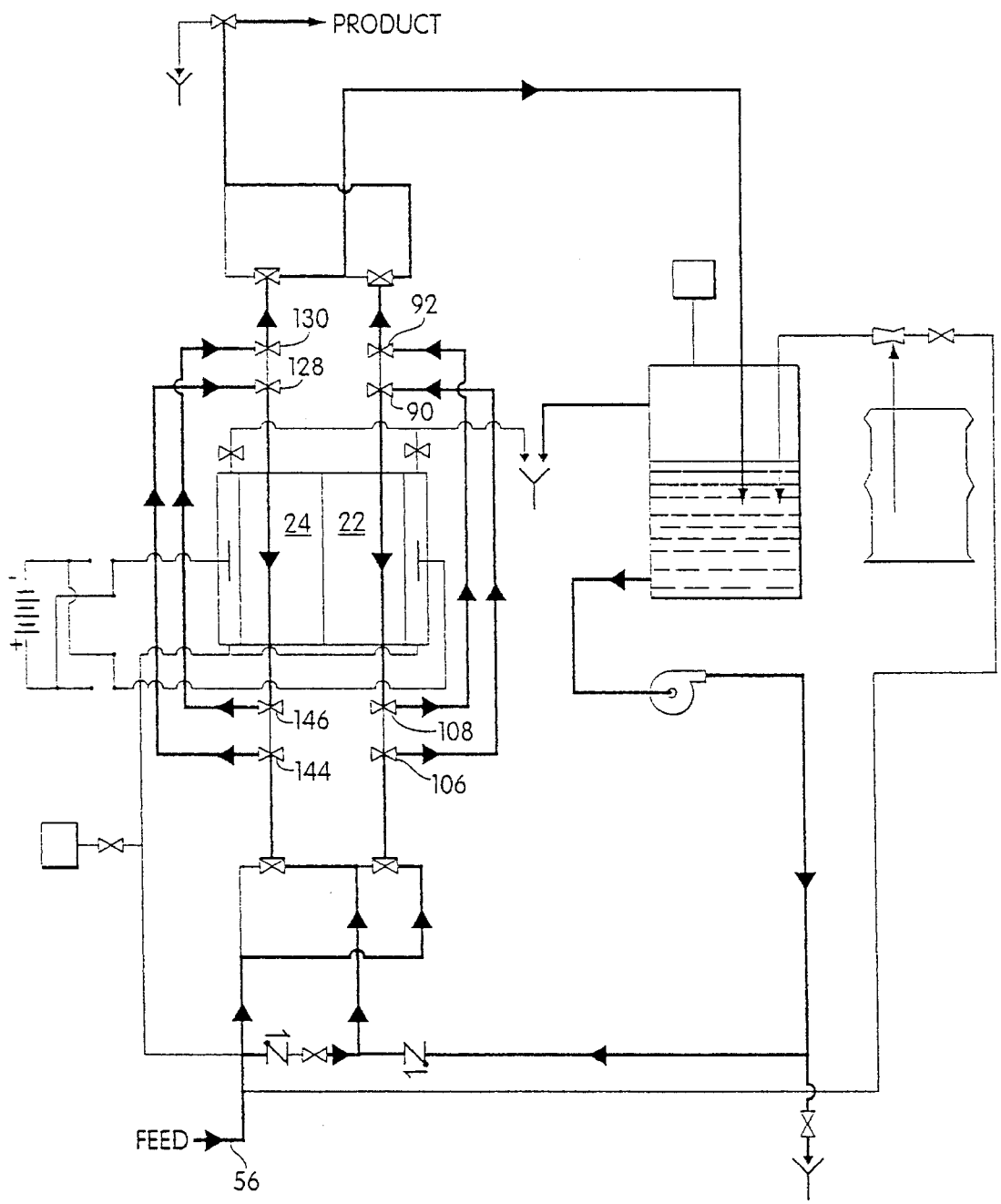
FIG. 15 is a schematic illustration of a preferred embodiment of the inventive apparatus adjusted so as to define a reversed-polarity, reversed-flow fluid circuit.

Thus far, a polarity reversal protocol has been described. Additionally, as mentioned above, a flow reversal protocol is also provided according to the present invention. According to the flow reversal protocol, flow may be reversed only in ion-concentrating compartment 22, or flow may be reversed simultaneously in ion-concentrating compartment 22 and ion-depleting compartment 24. Referring to FIG. 14, such simultaneous reversal is illustrated. In the ion-concentrating compartment, reversal is effected by switching reversal valves 106, 108, 90, and 92 so as to establish first fluid stream 62 flowing through ion-concentrating compartment 22 in a second direction opposite the first direction illustrated in FIG. 2. In the ion-depleting compartment 24, reversal is effected by switching flow reversal valves 144, 146, 128, and 130, so as to establish second fluid stream 58 flowing through concentrating compartment 24 in a second direction opposite the first direction illustrated in FIG. 2. With reference to FIG. 15, the flow reversal circuit is illustrated in conjunction with a step of the polarity reversal protocol in which compartment 22 defines a second ion-depleting compartment and compartment 24 defines a second ion-concentrating compartment.

The steps of the inventive flow reversal protocol illustrated in FIGS. 14 and 15 are analogous to the steps of the inventive polarity reversal protocol illustrated in FIGS. 2 and 10, respectively. That is, FIGS. 14 and 15 illustrate steps in a flow reversal protocol defining long-term operational modes. This is for purposes of illustration only. The inventive flow reversal steps may be carried out at any stage of the polarity reversal protocol, or may be carried out in conjunction with or independently of the polarity reversal protocol.

A polarity reversal protocol in accordance with the present invention may involve reversal steps of varying duration, the steps being carried out in varying sequence in accordance with or separate from the flow reversal protocol of the present invention. For example, multiple polarity reversal steps may be effected without any intervening flow reversal steps, or multiple flow reversal steps may be carried out without any intervening polarity reversal steps, and the duration of the individual steps of the polarity reversal and/or flow reversal may vary. When flow reversal is effected in conjunction with polarity reversal, the frequency of flow reversal steps relative to polarity reversal steps, and the duration of individual steps of either the flow or polarity reversal protocol, may be adjusted in response to a variety of factors. For example, adjustment may be made on the basis of the quality of feed fluid supplied to the apparatus, the degree of scaling tendency of apparatus membranes relative to resin filling apparatus compartments, the pressure drop through various compartments, fluid flow rate through various compartments, the level of voltage or current supplied by the electrical source, and the like.

In general, a flow reversal protocol effected in conjunction with a polarity reversal protocol offers the advantage of maintaining the chemical nature of the membranes defining, and the resin filling, the compartments of the electrodeionization apparatus in a more even manner throughout the compartments. During normal electrodeionization apparatus operation, a net flow of ionic species out of ion-depleting compartments and into ion-concentrating compartments occurs. Since fluid flow through the compartments occurs in one direction only during a single protocol step, the chemical make-up of all compartments inevitably varies between the inlet and outlet of each compartment during a single step. That is, the chemical make-up of membranes defining each compartment and the resin filler within each compartment is somewhat different near the inlet as opposed to near the outlet of each compartment during a single step.

For example, scale formation in electrodeionization apparatus may surprisingly occur to a greater extent near inlets of ion-concentrating compartments, rather than near compartment outlets, and may also occur within ion-depleting compartments, primarily near compartment inlets.

As another example, water splitting occurs to a greater extent near the outlets of ion-depleting compartments. Thus, the resin filler in ion-depleting compartments is regenerated to the hydrogen and hydroxide form to a greater extent near the outlets of these compartments. Regeneration of resin to the hydrogen and hydroxide form causes any scale or foulants on the resin to be loosened, and it is advantageous to facilitate such regeneration evenly throughout ion-depleting compartments. By effecting flow reversal, it is possible to cause water splitting to occur more evenly throughout ion-depleting compartments over the long term.

Similarly, it may be advantageous to cause other chemical reactions occurring predominantly near the inlet or outlet of a particular compartment to occur more evenly throughout the compartment over the long term, by effecting flow reversal. Of course, all compartments of the electrodeionization apparatus of the present invention serve as both ion-depleting compartments and ion-concentrating compartments according to the inventive polarity reversal protocol. Therefore, when flow reversal is used in conjunction with polarity reversal, any advantage realized in a depleting or concentrating compartment due to flow reversal will be realized in all compartments over the long term.

Control of the valves of the electrodeionization apparatus in accordance with the present invention may be effected in a variety of ways. For example, adjustment may be made manually, automatically or via a combination of procedures carried out both manually and automatically. According to a preferred embodiment, the use of microprocessor-based controllers or computers are used to adjust the valves of the inventive electrodeionization apparatus to desired positions. This is especially advantageous in controlling the pulsed flow of electrolyte through electrode compartments 36 and 38.

As noted above, the length of polarity or flow reversal cycles or steps can be equal or non-equal in duration. For example, a half or full polarity reversal cycle may be programmed into a microprocessor, and may be initiated via manual switching, via a signal from some other controller or device outside the electrodeionization apparatus (for example, a timer, product water tank level monitor, product water quality monitor, pre-treatment backwash device, central computer, electric current sensing device, ion monitor, bacteria sensing monitor, or the like), or by an internal timer within the apparatus. In such a case, the microprocessor would control the order and duration of steps within the half or full cycle. Additionally, a desired order and frequency of polarity reversal cycles, flow reversal cycles, or a combination may be controlled by a microprocessor, and may be fully automatic.

Thus, a wide variety of combinations of half or full polarity reversal cycles, optionally integrated with flow reversal cycles, may be tailored to meet a wide variety of fluid purification needs, and control of the order and frequency of the cycles and steps of the cycles may be completely manual, completely automatic, or a combination of manual and automatic. Preferably, the order and duration of the particular steps of a polarity reversal half cycle are microprocessor-controlled, and external control, either manual, or automatic in response to a condition of the apparatus or feed or product fluid, will control the frequency of half cycle switching and flow reversal incorporation.

As noted above, according to a preferred embodiment of the present invention, the ion-concentrating compartments of the electrodeionization apparatus are arranged so that fluid flows through ion-concentrating compartments in an upward direction, so as to sweep gas generated in the concentrating compartments out of the compartments more efficiently. According to the flow-reversal protocol described above with reference to FIGS. 14 and 15, the flow-reversal steps may result in fluid flow through concentrating compartments in a general downward direction during alternate flow reversal steps. Therefore, such steps resulting in downward flow may be advantageously carried out for a short period of time only, and the direction of flow through the compartments returned to its original direction. In this way the time during which flow through the concentrating compartments in an upward direction occurs is maximized. Alternatively, the electrodeionization apparatus may be designed so that compartments can be arranged in a first orientation during forward flow, and in a second orientation during reverse flow, so that in either case flow is in a general upward direction through the concentrating compartments results.

The electrodeionization of the present invention has thus far been described with reference to schematic illustrations. A preferred arrangement for the purification center of the apparatus is schematically represented in FIGS. 1–15 by concentrating compartment 22, depleting compartment 24, and electrode compartments 36 and 38. Such a preferred arrangement is illustrated in greater detail in FIG. 16.

Figure 16:
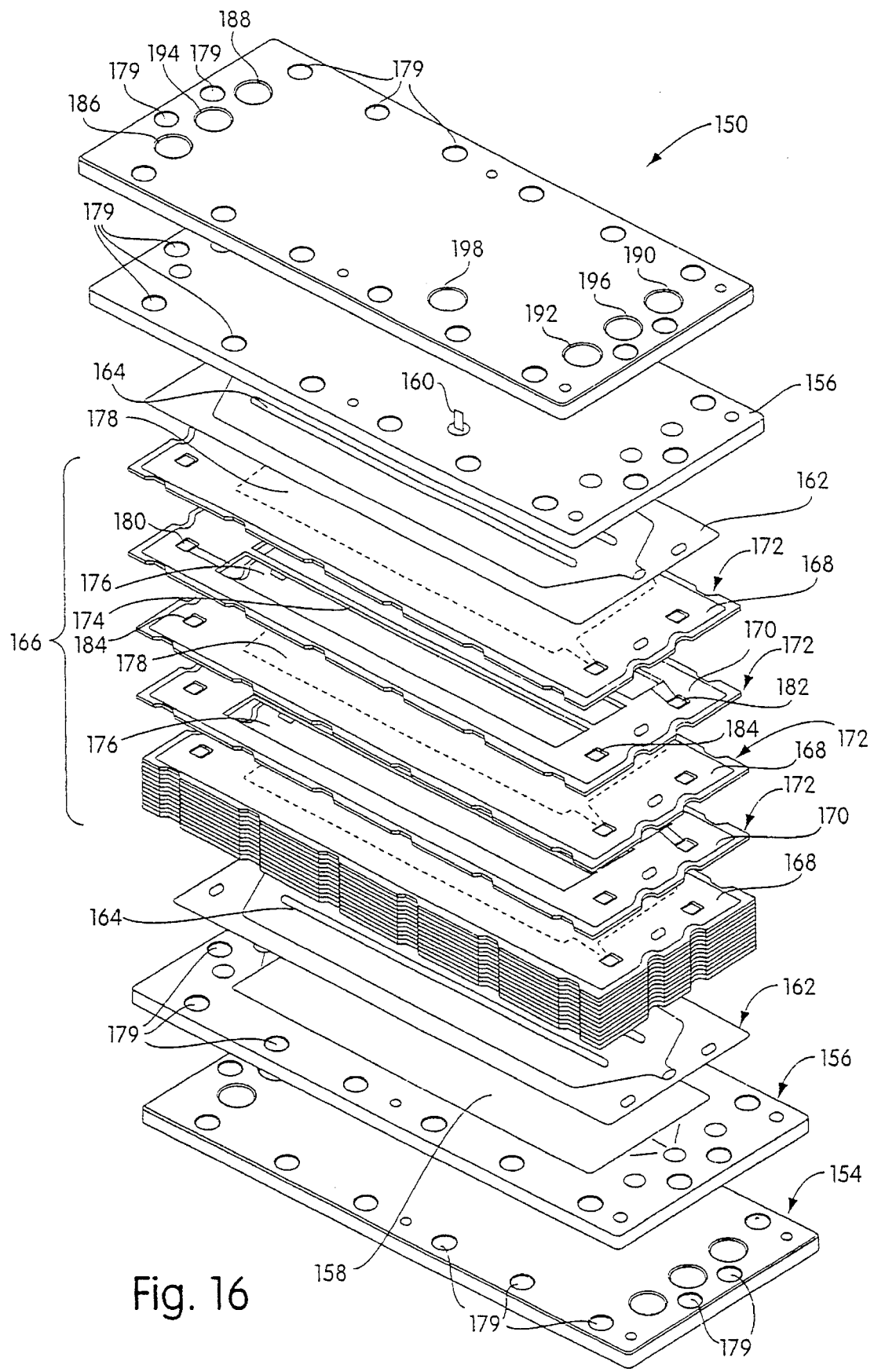
FIG. 16 is an exploded view of an electrodeionization stage according to a preferred embodiment of the present invention.

Referring to FIG. 16, purification center 150 comprises a plurality of stacked compartments bounded by a pair of opposed end plates 154. Adjacent to each end plate is an end block 156 which serves as a mounting for a pair of opposed electrodes 158. Each electrode has a tab 160 which extends through its adjacent end block and end plate. In the perspective of FIG. 16, a lower electrode 158 is visible and the tab 160 of the upper electrode is visible. Adjacent to each electrode is an electrode spacer 162 having a plurality of ribs 164 which define fluid flow paths through the electrode spacer. An inert screen (not shown) can be positioned adjacent to the ribs to provide turbulent fluid flow therethough.

A stack 166 of alternating ion-depleting and ion-concentrating compartments is positioned between the opposing electrode spacers 162. The stack 166 comprises a series of alternating anion exchange membranes 168 and cation exchange membranes 170 is secured to, and separated by, spacers 172. The alternating membranes 168, 170 and spacer 172 define individual ion-depleting and ion-concentrating compartments, 176 and 178, respectively. Each spacer 172 includes a plurality of ribs 174 to define flow paths through the ion-depleting or ion-concentrating compartments. Each of the compartments 176, 178 is filled with an ion exchange resin, preferably a mixture which comprises an anion exchange resin and a cation exchange resin. Holes 179 in end plates 154 and in end blocks 156 are designed to accomodate tie bars (not shown) which hold together and compress the plurality of stacked compartments of purification center 150.

The spacers 172 are manifolded such that each of the compartments is in fluid communication with its like compartments. Thus, the ion-depleting compartments 176 are each in fluid communication with one another, and the ion concentrating compartments 178 are each in fluid communication with one another. The manifolding can be achieved by providing each spacer with a chamber inlet 180 and a chamber outlet 182 as well as pair of transfer channels 184 which allow fluid to be passed through the spacer from adjacent compartments without entering the chamber defined, in part, by that spacer. The chamber inlet 180 and chamber outlet 182 can be positioned on diagonally opposing corners of each spacer so that if a adjacent, identical, spacers are inverted, a pair of interleaved, but isolated flow paths through the stack 166 is formed. As such, it is possible to use a single spacer design which provides a stack having a plurality of ion-depleting compartments in fluid communication with each other, a plurality of ion-concentrating compartments in fluid communication with each other, but no fluid communication between the ion-depleting compartments and the ion-concentrating compartments. Of course, the ion-depleting compartments and the ion-concentrating compartments can be said to achieve some mutual communication via ions which transfer across the ion-exchange membranes.

Each end plate 154 is provided with a plurality of ports to allow fluid flow through the device. Thus, the end plate can include a concentrate inlet port 186, a diluting stream inlet port 188, a concentrate outlet port 190, a dilute product outlet port 192, an electrode inlet port 194 and an electrode outlet port 196. Additionally, an electrode contact port 198 is also provided to allow the tab 160 of each electrode 158 to project from the ends of the device.

Figure 17:
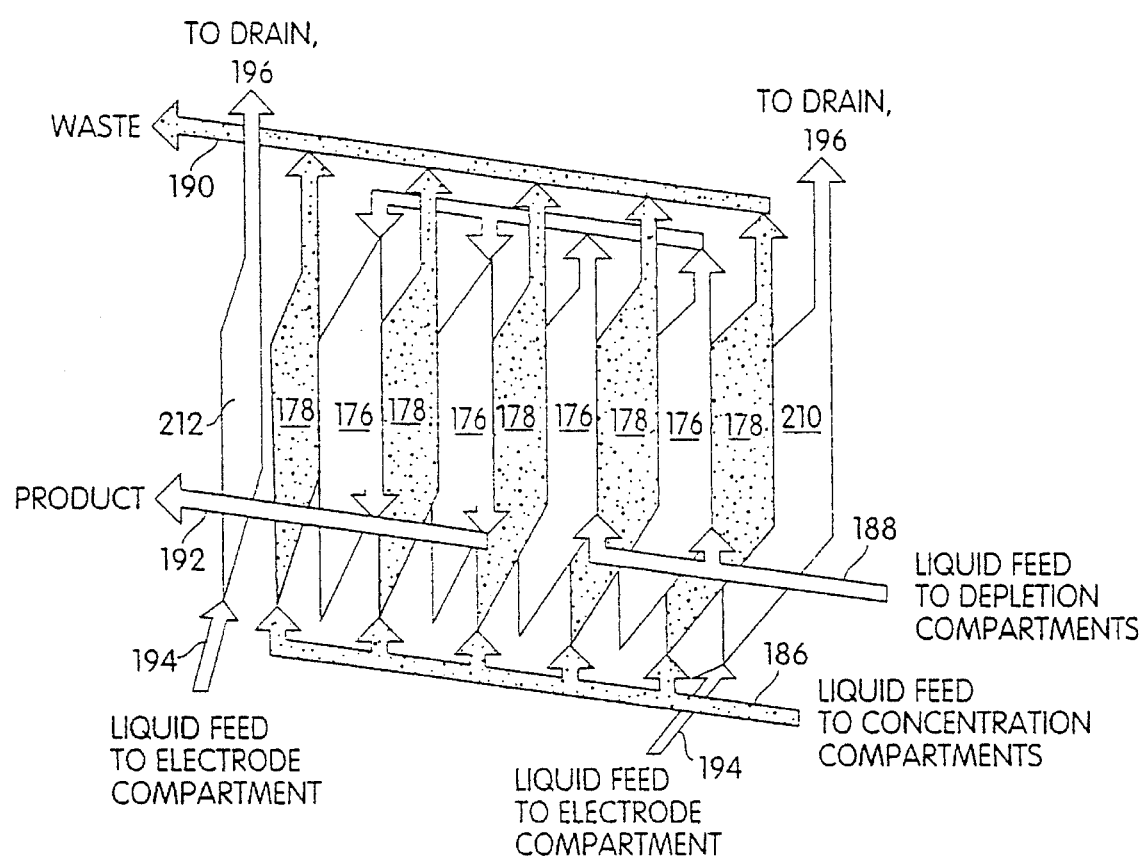
FIG. 17 is a schematic view illustrating the operation of the stage illustrated in FIG. 16.

Referring to FIG. 17, the flow paths of the liquids in the various compartments of the purification center illustrated in FIG. 16 are explained. Shown is a two-stage device, although single or multiple-stage devices can be used as well. Liquid to be purified enters inlet 188, passes through depletion compartment 176, is then passed through a second depletion compartment 176 and is recovered from outlet 192. It is to be understood that liquid flow through the depletion compartments can be in one direction in each stage. Also, the liquid can be made to flow through more than one depletion compartment in each stage. In addition, the liquid effluent from a depletion compartment can be split into multiple streams and then passed through a second set of depletion compartments. Concentrating liquid is passed through inlet 186 through concentrating compartments 178 and thence through outlet 190 to drain. Liquid electrolyte is circulated through electrode compartments 164 and 212 from inlets 194 and is discarded to drain through outlets 196.

In the apparatus depicted in FIG. 16 above, each ion-depleting and ion-concentrating compartment shared a common membrane wall with its adjacent compartment. Since each of the ion-depleting and ion-concentrating compartments is filled with ion exchange resin, separating the compartments if, for example, maintenance is needed, is difficult. One common approach to addressing this problem is to provide inert screen spacers periodically within the stack of ion-depleting and ion-concentrating compartments. However, that approach adds further complications since fluid and electrical communication must be maintained across the screens. As a result, complicated additional manifolding is required.

Figure 18B:
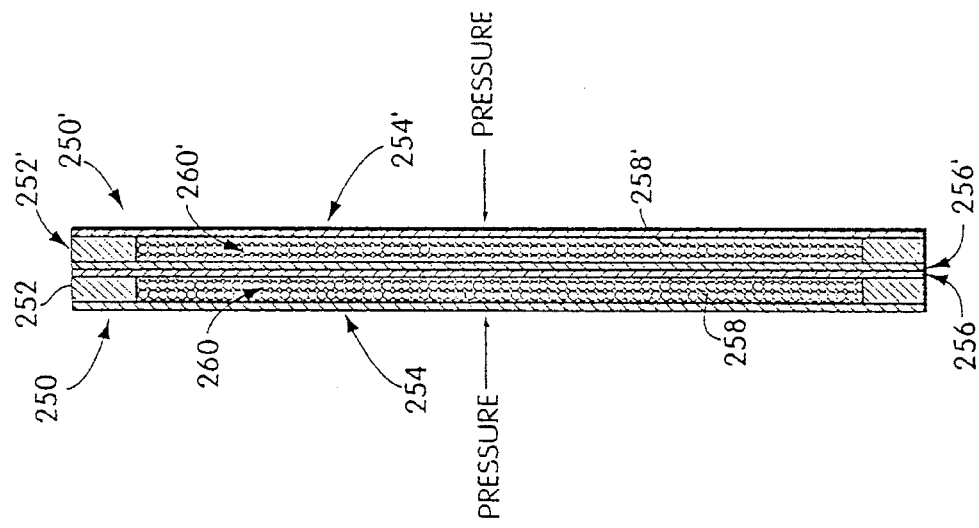
FIG. 18b is a schematic sectional view of a preferred embodiment of the inventive apparatus of two separate electrodeionization subcompartments from adjacent stacked compartment groupings after being compressed.
Figure 18A:
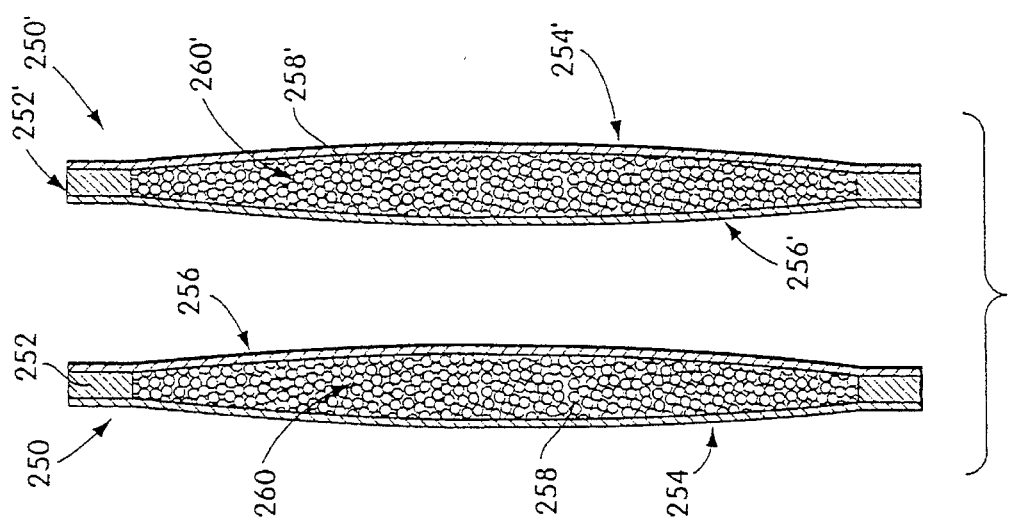
FIG. 18a is a schematic sectional view of a preferred embodiment of the inventive apparatus of two separate electrodeionization subcompartments from adjacent stacked compartment groupings prior to being compressed.

The use of inert screen spacers can be avoided by providing each of the ion-depleting and ion-concentrating compartments as a separate, independent module maintained in a coextensively contacting relationship with its adjacent modules. As shown in FIG. 18*a*, each module 250, 250' includes a spacer 252, 252' having an anion exchange membrane 254, 254' mounted on one side and an opposing cation exchange membrane 256, 256' mounted on its opposite side. The membranes and the spacer define a compartment 258, 258' that is filled with an ion exchange medium 260, 260', preferably a mixture of anion and cation resins.

Standing alone, the membranes of each module tend to bulge outward as a result of resin swelling. Although the swelling affects the intermembrane spacing, when the individual modules are held together under pressure as shown in FIG. 18*b* the resins are compressed and the membranes are forced into a parallel relationship with desired intermembrane spacing. As can be seen in FIG. 18*b*, the modules 250, 250' are forced together under pressure provided by adjacent modules and, ultimately, the end plates positioned at either end of the purification center stack. The pressure compresses the resin 260, 260' contained in each compartment 258, 258' and also forces the membranes into a parallel configuration conforming with the desired intermembrane spacing. Unlike conventional electrodeionization apparatus, in the configuration of FIG. 18*b* the cation membrane 256 of the first module 250 is pressed into coextensive contact with the cation exchange membrane 256' of the adjacent module 250'. Although not shown in the Figure, if additional modules were provided adjacent to module 250' the anion exchange membrane 25' of module 250' would be in coextensive contact with an anion exchange membrane of the adjacent module. Thus, unlike a configuration in which each compartment is separated by a single ion exchange membrane, in the configuration of FIG. 18*b*, each compartment is separated from the adjacent compartment by a pair of like, coextensively contacting membranes. Unlike the bipolar membrane configurations of some prior art devices (see, for example, U.S. Pat. No. 4,871,431 to Parsi), the apparatus of FIG. 18*b* results in what is, for all practical purposes, a single anion or cation exchange membrane of double thickness. Such a configuration offers performance that is equivalent to devices having the compartments separated by a single ion exchange membrane. Since, however, the apparatus of FIGS. 18*a* and 18*b* provides a modular design, the need to provide inner screens between inner portions of the stack is eliminated and, if desired, it becomes possible to replace even a single ion exchange compartment if so desired. Finally, since the resins contained within the module stack will be maintained under pressure on either side of the pairs of coextensively contacting like membranes, the resins act to prevent movement of the membranes and to maintain the desired intermembrane spacing across each ion exchange compartment.

The following examples are intended to illustrate the benefits of the present invention. However, they are not intended to exemplify the entire scope of the invention. For example, although a particular polarity reversal protocol is exemplified, it may be advantageous in some circumstances to rearrange the order of protocol steps as described above and/or as described in the examples. Additionally, steps of the protocol may be eliminated, or settings of some of the steps may be employed in others of these steps. For example, as described above, the timing of reversal of polarity of electrodes 32 and 34 may be adjusted in the protocol, and/or the de-energized step may be eliminated. As another example, introduction of chemical and/or biological species from tank 88 may be effected at any step of the protocol, or may be eliminated from the protocol. Similarly, makeup and blowdown may be effected at any step or eliminated completely. The flow reversal steps, illustrated in FIGS. 14 and 15, may be effected at any point during the polarity reversal protocol, or may not be necessary in the protocol. Particularly when low-quality fluid is used as a feed fluid, flow reversal may be necessary quite often, for example as often as or more often than the frequency of the polarity reversal protocol, as low-quality fluid typically contains particulate material which may more quickly foul the ion-exchange resin and ion-permeable membranes of the concentrating compartments of the apparatus. Alternatively, if particularly high-quality feed fluid is employed, the flow reversal may be completely unnecessary. The above-described and other modifications and their equivalent are understood to be within the scope of the present invention.

EXAMPLE 1

Exemplary Polarity Reversal Protocol

Two identical 4 cell pair single stage electrodeionization apparatus were assembled in a configuration of the type shown in FIG. 16, each comprised of the following components: two 0.5 inch thick aluminum end plates, two 0.5 inch thick polypropylene electrode blocks, two iridium oxide coated titanium electrodes each separated from their nearest (cation permeable) ion exchange membranes by a 0.025 inch thick woven polyester electrode compartment screen gasketed around the periphery by a frame of thermoplastic elastomer, an alternating stack of nine heterogeneous polyethylene-based cation and anion ion exchange membranes in a sequence beginning and ending with a cation membrane, each membrane adhered with adhesive to polypropylene intermembrane spacers (intermembrane spacing of about 0.1 inches and flow path length of 13 inches, each spacer comprised of 3 subcompartments each of width approximately 1.2 inches), each subcompartment filled with Rohm and Haas Amberjet mixed ion exchange resin in a 60:40 anion to cation ratio by volume.

The two apparatus were fed in parallel with a well water pre-treated by a UV sanitizing treatment, followed by granular activated carbon, and followed by 0.5 micrometer nominal filtration. Each ion-depleting and each ion concentrating stream was fed in parallel in a downflow direction with no stream recirculation and each stream was operated at a flow rate of about 0.9 lpm. A DC voltage of about 19.5 volts was applied between the electrodes of each apparatus. The feed water to each apparatus contained about 235 ppm total dissolved solids (as $CaCO_3$), including 102 ppm calcium, 57 ppm magnesium, and 117 ppm bicarbonate ions, 9 ppm silica, and a pH of about 8.05. The product and concentrate outlets were substituted for one another and the polarity was reversed at 30 minute intervals on each apparatus. Over a 4 day period, the operating voltage was gradually increased to 41 volts on each apparatus in order to create a readily discernable pH shift within the apparatus. Beginning on the fourth day and every 24 hours thereafter, the flow directions of all streams on the first apparatus were reversed so as to alternate on a daily basis between the upflow and downflow directions. There was no flow reversal on the second apparatus and both apparatus continued identical polarity reversal sequences at 30 minute intervals.

On day 4, purification levels in the ion depleting streams of both apparatus as monitored by electrical conductance were about 80%. Beginning with day 5 of operation, the ion depleting streams of both apparatus tended to increase in pH to a maximum of about 9.5 and then upon polarity reversal, the pH of the streams—now ion concentrating streams— tended to decrease to a minimum of about 6.6. Langelier saturation index calculations indicated that the concentrate streams had a consistently low scaling propensity, and that at the high pH extreme, the depleting streams had a high scaling propensity. On day 5 of operation, the purification performance of the two apparatus began to differ—the first maintained approximately 80% purification through day 12 and the second apparatus gradually declined to about 60% purification. During this time, the first apparatus maintained an electrical resistance of about 25 ohms, and the second apparatus gradually increased in electrical resistance to about 31 ohms. After day 12, the test was ended and the apparatus were disassembled. Little or no scale was observed on the membrane or electrode surfaces. Scale was detected in both apparatus within the interstices of the resin bead filler. There was considerably less scale within the filler of the first apparatus.

EXAMPLE 2

Second Exemplary Polarity Reversal Protocol

Two identical 4 cell pair single stage electrodeionization apparatus as described in Example 1 were fed in parallel with water pre-treated by reverse osmosis. The first apparatus was fed in an upflow direction and the second apparatus was fed in a downflow direction. Each stream operated at a flow rate of about 1.1 lpm. Each concentrating stream was recirculated and makeup water was fed at a rate of about 0.1 lpm. The feed conductivity of the ion depleting stream and concentrate makeup was about 13 microsiemen-cm$^{-1}$ and contained mixed ionic salts, approximately 4 ppm dissolved carbon dioxide, and approximately 250 parts-per-billion (ppb) dissolved silica. A DC voltage of about 20 volts was applied between the electrodes of each apparatus. Polarity was reversed every 24 hours by performing the steps of: (1) shutting off power (at time=0); (2) substituting the depleting and concentrating streams for one another (at time=10 seconds); (3) reversing polarity (at time=15 seconds); and (4) turning on power (at time=20 seconds). Product water was continuously obtained throughout the cycle.

Immediately prior to initiation of the polarity reversal protocol, the product water electrical resistivity was about 17 megohm-cm and the silica concentration was about 7 ppb for both apparatus. The product water resistivity for both apparatus declined to a minimum of about 6 megohm-cm for both apparatus at time=1 minute. For the first and second apparatus the maximum silica concentration was about 164 ppb and 260 ppb respectively, also occurring at time=1 minute. The first apparatus and second apparatus attained a product water resistivity of about 15 megohm-cm at time=25 and 45 minutes respectively, and they attained a purity of 8 ppb silica at time=6 minutes and 15 minutes respectively.

EXAMPLE 3

Third Exemplary Polarity Reversal Protocol

An electrodeionization apparatus was constructed in a manner identical to that described in Example 1 except that the cell compartments were filled with Dow Marathon ion exchange resin filler.

The apparatus was fed permeate water from a reverse osmosis apparatus. Each ion-depleting and each ion-concentrating stream was fed in parallel in a downflow direction and each diluting and concentrating stream was operated at a flow rate of about 0.2 lpm per cell pair. A DC voltage of about 20 volts was applied between the electrodes of the apparatus. The feed water to the apparatus contained about 4 ppm total dissolved solids (as $CaCO_3$), including 2.5 ppm carbon dioxide and 1.5 ppm mixed ions.

(i) In a first polarity reversal protocol, considered as a control test indicative of background art, the ion-depleting and ion-concentrating streams were operated with no concentrate recirculation and the streams were interchanged at approximately the same time as the electrical polarity was reversed;

(ii) In a second polarity reversal protocol, the ion-concentrating stream was recirculated and combined at the concentrate inlet of the apparatus with a feed of RO permeate. Combined concentrate was removed from the recirculating stream at a rate such that the overall product water recovery from the apparatus was approximately 90% of the total RO permeate being fed to the apparatus. The streams were interchanged at approximately the same time as the electrical polarity was reversed;

(iii) In a third polarity reversal protocol, the streams were fed and recirculated in a manner identical to example (3,ii). The reversal protocol comprised the following steps: (a) the DC power was switched off; and (b) the streams were interchanged, the electrical polarity was reversed, and the DC power was re-applied at about the time that the product resistivities of the streams were equal;

(iv) In a fourth polarity reversal protocol, the streams were fed and recirculated in a manner identical to example (3,ii). The reversal protocol comprised the following steps: (a) the feed and product stream flows were modified to operate in a manner identical to example (3,i); (b) after operating in mode (iv, a) for about two minutes the streams were interchanged and the electrical polarity was reversed; and (c) the stream flows were returned to a manner identical to example (3,ii) at about the time that the product resistivities of the streams were equal;

(v) In a fifth polarity reversal protocol, the streams were fed and recirculated in a manner identical to example (3,ii). The reversal protocol comprised the following steps: (a) the feed and product stream flows were modified to operate in a manner identical to example (3,i); (b) after operating in mode (v, a) for about two minutes, the DC power was switched off; (c) the stream flows were interchanged and the DC power reversed and re-applied at about the time that the product resistivities of the streams were equal; and (d) the stream flows were returned to a manner identical to example (3,ii) after operating in mode (v,c) for about 10 minutes; and (vi) In a sixth polarity reversal protocol, the streams were fed and recirculated in a manner identical to example (3,ii). The reversal protocol comprised the following steps: (a) RO permeate feed to the recirculating concentrate stream was shut off; (b) a concentrated aqueous sodium chloride solution was fed to the recirculating concentrate stream in an amount sufficient to create a 2% salt solution within the concentrating stream; (c) after operating in mode (vi,b) for about 5 minutes, the feed and product stream flows were modified to operate in a manner identical to example (3,i); (d) after operating in mode (vi,c) for about 2 minutes, the streams were interchanged and the DC polarity was reversed; and (e) at about the time that the product resistivities of the streams were equal, the stream flows were returned to a manner identical to example (3,ii).

For each polarity reversal protocol test, water electrical resistivity was monitored and product water was continuously collected from the stream producing the best water quality. Product water was collected at steady state operation prior to the initiation of the reversal cycle, during the time throughout the reversal cycle, and subsequent to the reversal cycle until steady state was re-achieved. Table I below tabulates the length of time that the product water quality was lower than given resistivity values at any time during the continuous operation of the apparatus.

TABLE I

| Resistivity Value | Time Duration Lower Than Resistivity Value (hours) For test protocol: | | | | | |
|---|---|---|---|---|---|---|
| (megohm-cm) | #1 | #2 | #3 | #4 | #5 | #6 |
| 4 | 0 | 0 | 0 | 0 | 0 | 0 |
| 6 | 0.7 | 0 | 0 | 0 | 0 | 0.5 |
| 8 | 2.1 | 0 | 0 | 0 | 0 | 0.7 |
| 10 | 3.8 | 0 | 0 | 0 | 0 | 1.0 |
| 12 | 4.9 | 0 | 0 | 0 | 0 | 1.1 |
| 14 | 6.3 | 1.6 | 0.5* | 0 | 0 | 1.6 |
| 16 | 8.7 | 4.4 | 1.0* | 0 | 0 | 2.6 |

*Exclusive of 4 hour delay between resistivity cross-over and polarity reversal due to operator unavailability Table II tabulates the time when the lowest product water resistivity was collected (i.e., the time when the two streams were at equal water resistivity).

TABLE II

| Protocol Number | Description of time = 0 | Time of lowest Product Resistivity (hours) |
|---|---|---|
| 1 | Polarity reversal | 5.1 |
| 2 | Polarity reversal | 3.2 |
| 3 | Power off | 24 |
| 4 | Remove recirculation | 21 |
| 5 | Remove recirculation | 7.2 |
| 6 | Sodium chloride addition | 0.1 |

EXAMPLE 4

First Comparison of Electrodeionization Apparatus With and Without Cell Pair Groupings Two apparatus were assembled. The first comprised components as described in Example 1, except that it comprised two cell groupings of two cell pairs each, and except that the resin filler was Dow Marathon ion exchange resin. Each cell grouping was comprised of five alternating cation and anion membranes beginning and ending with a cation membrane. The second apparatus was identical to the first except that it comprised five cell pairs in one cell grouping comprised of eleven alternating cation and anion membranes beginning and ending with a cation membrane.

Each apparatus was fed with water pre-treated by reverse osmosis containing 4 ppm calcium, 6 ppm dissolved carbon dioxide and 296 ppb silica at a flow rate to the ion depleting streams of 0.2 lpm per cell. The concentrating streams were recirculated with no make-up feed water at a flow rate of 0.2 lpm per cell. A DC voltage of 3 volts per cell pair was applied to each apparatus.

After 24 hours operation the first apparatus produced product water with a resistivity of 11 megohm-cm, apparatus amperage was 0.58 amps, and the concentrate stream contained 140 ppm calcium. The second apparatus produced product water with a resistivity of 7 megohm-cm, apparatus amperage was 0.78 amps, and the concentrate stream contained 120 ppm calcium. After 72 hours operation, both apparatus were disassembled. Scale was found within the concentrating cells of both apparatus. There was no scale in the first apparatus at the interface between the cell pair groupings.

EXAMPLE 5

Second Comparison of Electrodeionization Apparatus With and Without Cell Pair Groupings Two apparatus were assembled and fed water as described in Example 4, except that the recirculating concentrating streams were fed makeup water at a rate of about 0.02 lpm per concentrating cell. The first and second apparatus were operated at 15 volts and amperage was about 0.60 and 0.58 amps, respectively. After 8 days operation, product water electrical resistivity was about 16.6 megohm-cm for the first apparatus and about 15 megohm-cm for the second apparatus. On the ninth day of operation, depleting and concentrating streams were substituted for one another, followed by reversing the polarities of each apparatus. On the eleventh day of operation, product water electrical resistivity was about 17 megohm-cm for the first apparatus and about 15 megohm-cm for the second apparatus. Upon termination of the test, the first apparatus was disassembled and there was no scale or any sign of membrane damage at the interface between the cell pair groupings.

Equivalents

Those skilled in the art will readily appreciate that fall parameters listed herein are meant to be exemplary and that actual parameters will depend upon the specific application for which the inventive electrodeionization apparatus is being used. It is, therefore, to be understood that the foregoing embodiments and examples are presented by way of example only, and that, within the scope of the appended claims and equivalents thereto, the invention may be practised otherwise than as specifically described.

What is claimed is:

1. Electrodeionization apparatus comprising:

a plurality of compartments comprising at least one ion-concentrating compartment positioned adjacent to at least one ion-depleting compartment, the ion-concentrating and ion-depleting compartments each containing an ion-exchange material and the plurality of compartments being defined in part by spaced, alternating anion-permeable membranes and cation-permeable membranes;

a first electrode on a first side of the plurality of compartments and in electrical communication therewith;

a second electrode on a second side of the plurality of compartments and in electrical communication therewith;

an electrical source in electrical communication with the first and second electrodes, which, in combination with the electrodes and the plurality of compartments defines an electrical circuit;

a first fluid circuit connecting a source of a first fluid stream having an ionic concentration to the ion-concentrating compartment, and connecting a source of a second fluid stream having an ionic concentration to the ion-depleting compartment; and a second fluid circuit connecting a source of a third fluid stream to the ion-concentrating compartment, and connecting the source of the second fluid stream to the ion-depleting compartment, the third fluid stream having an ionic concentration lower than that of the first fluid stream.

2. Electrodeionization apparatus of claim 1, wherein the first fluid circuit further comprises, in fluid communication with the first fluid stream, a source of species selected from the group consisting of chemical species, biological species, and mixtures thereof.

3. Electrodeionization apparatus of claim 1, wherein the first fluid circuit includes a recirculation path arranged to recirculate fluid flow from an exit of the ion-concentrating compartment to an entrance of the ion-concentrating compartment.

4. Electrodeionization apparatus of claim 3, wherein the first fluid circuit further comprises an input in fluid communication with the recirculation flow path.

5. Electrodeionization apparatus of claim 4, wherein the input is in fluid communication with a source of species selected from the group consisting of chemical species, biological species, and mixtures thereof.

6. Electrodeionization apparatus of claim 4, wherein the input is in fluid communication with a source of a fluid stream having an ionic concentration lower than that of the first fluid stream, the recirculation flow path further comprising an outlet for removing overflow from the recirculation flow path.

7. Electrodeionization apparatus of claim 3, wherein the recirculation flow path further comprises a liquid/gas interface area.

8. Electrodeionization apparatus of claim 3, wherein the liquid/gas interface area comprises a tank and a gas pressure control to facilitate removal of gas from fluid passing through the ion-concentrating compartment.

9. Electrodeionization apparatus of claim 1, wherein the second fluid stream source and the third fluid stream source are the same.

10. Electrodeionization apparatus of claim 1, wherein the first fluid circuit connects the source of the first fluid stream to the ion-concentrating compartment so as to establish the first fluid stream flowing through the ion-concentrating compartment in a first direction, the apparatus further comprising a third fluid circuit connecting the source of the first fluid stream to the ion-concentrating compartment so as to establish the first fluid stream flowing through the ion-concentrating compartment in a second direction opposite the first direction.

11. Electrodeionization apparatus of claim 10, wherein the first fluid circuit connects the source of the second fluid stream to the ion-depleting compartment so as to establish the second fluid stream flowing through the ion-depleting compartment in a first direction, and the third fluid circuit connects the source of the second fluid stream to the ion-depleting compartment so as to establish the second fluid stream flowing through the ion-depleting compartment in a second direction opposite the first direction.

12. Electrodeionization apparatus comprising:
- a plurality of compartments comprising at least one ion-concentrating compartment positioned adjacent to at least one ion-depleting compartment, the ion-concentrating and ion-depleting compartments each containing an ion-exchange material and the plurality of compartments being defined, in part, by spaced, alternating anion-permeable membranes and cation-permeable membranes;
- a first electrode on a first side of the plurality of compartments and in electrical communication therewith;
- a second electrode on a second side of the plurality of compartments and in electrical communication therewith;
- an electrical source in electrical communication with the first and second electrodes, which, in combination with the electrodes and the plurality of compartments, defines an electrical circuit;
- a forward flow fluid circuit connecting a source of a first fluid stream to a first port of the ion-concentrating compartment to provide the first fluid stream flowing through the ion-concentrating compartment in a first direction, and connecting a source of a second fluid stream to a first port of the ion-depleting compartment, to provide the second fluid stream flowing through the ion-depleting compartment in a first direction; and
- a reverse flow fluid circuit connecting the source of the first fluid stream to a second port of the ion-concentrating compartment to provide the first fluid stream flowing through the ion-concentrating compartment in a second direction opposite the first direction.

13. Electrodeionization apparatus of claim 12, wherein the forward fluid circuit connects the second port of the ion-concentrating compartment to the first port thereof to recirculate the first fluid stream through the ion-concentrating compartment.

14. Electrodeionization apparatus of claim 12, wherein the reverse fluid circuit connects the source of the second fluid stream to a second port of the ion-depleting compartment to provide the second fluid stream flowing through the ion-depleting compartment in a second direction opposite the first direction.

15. Electrodeionization apparatus of claim 12, further comprising a reverse polarity fluid circuit connecting the source of the first fluid stream to the first port of the ion-depleting compartment and connecting the source of the second fluid stream to the first port of the ion-concentrating compartment.

16. In electrodeionization apparatus comprising a plurality of ion-concentrating compartments and ion-depleting compartments, each ion-concentrating compartment positioned adjacent to at least one ion-depleting compartment, the compartments each containing an ion-exchange material, and electrodes positioned to create an electrical potential across the compartments, the improvement comprising:
- a fluid inlet and a fluid outlet in each of the ion-concentrating compartments, the fluid inlet being positioned lower than the fluid outlet, such that a gas generated in each ion-concentrating compartment during operation of the apparatus can be efficiently removed therefrom.

17. Electrodeionization apparatus comprising:
- a plurality of compartments having at least one ion-concentrating compartment positioned adjacent to at least one ion-depleting compartment, the ion-concentrating and ion-depleting compartments each containing an ion-exchange material and the plurality of compartments being defined in part by spaced, alternating anion-permeable membranes and cation-permeable membranes;
- a first electrode on a first side of the plurality of compartments and in electrical communication therewith;
- a second electrode on a second side of the plurality of compartments and in electrical communication therewith;
- an electrical source in electrical communication with the first and second electrodes, which, in combination with the electrodes and the plurality of compartments, defines an electrical circuit;
- a first fluid circuit connecting a source of a first fluid stream having an ionic concentration to the ion-concentrating compartment, and connecting a source of a second fluid stream having an ionic concentration to the ion-depleting compartment, the first fluid circuit including a recirculation path arranged to recirculate fluid flow from an exit of the ion-concentrating compartment to an entrance thereof; and
- a liquid/gas interface area in the recirculation path.

18. Electrodeionization apparatus of claim 17, wherein the liquid/gas interface area comprises a tank and a gas pressure control to facilitate removal of gas from fluid passing through the ion-concentrating compartment.

19. Electrodeionization apparatus comprising:

a plurality of compartments comprising at least one ion-concentrating compartment positioned adjacent to at least one ion-depleting compartment, the ion-concentrating and ion-depleting compartments each containing an ion-exchange material and the plurality of compartments being defined in part by spaced, alternating anion-permeable membranes and cation-permeable membranes;

a first electrode on a first side of the plurality of compartments and in electrical communication therewith;

a second electrode on a second side of the plurality of compartments and in electrical communication therewith;

an electrical source in electrical communication with the first and second electrodes, which, in combination with the electrodes and the plurality of compartments, defines an electrical circuit;

a first fluid circuit connecting a source of a first fluid stream having an ionic concentration to the ion-concentrating compartment, and connecting a source of a second fluid stream having an ionic concentration to the ion-depleting compartment, the first fluid circuit including a recirculation path arranged to recirculate fluid flow from an exit of the ion-concentrating compartment to an entrance thereof; and a source of species selected from the group consisting of chemical species, biological species, and mixtures thereof in fluid communication with the recirculation path.

20. Compartments for electrodeionization apparatus, comprising:

an ion-depleting compartment containing an ion-exchange material and defined in part by a first membrane permeable to ions of a first polarity and a second membrane spaced apart from the first membrane and permeable to ions of a second polarity opposite the first polarity;

an ion-concentrating compartment containing an ion-exchange material and defined in part by a third membrane permeable to ions of the first polarity and a fourth membrane spaced from the third membrane and permeable to ions of the second polarity, wherein the first membrane co-extensively contacts the third membrane.

21. Compartments for electrodeionization apparatus, comprising:

a plurality of stacked groups of compartments, each group defined in part by exterior membranes at first and second ends thereof, and each group comprising a plurality of compartments including at least one ion-concentrating compartment positioned adjacent to at least one ion-depleting compartment, the ion-concentrating and ion-depleting compartments each containing an ion-exchange material and the plurality of compartments being defined in part by spaced, alternating membranes permeable to ions of a first polarity and membranes permeable to ions of a second polarity opposite the first polarity, wherein an exterior membrane of at least one group co-extensively contacts an exterior membrane of an adjacent group.

22. Compartments for electrodeionization apparatus of claim 21, wherein the exterior membrane of at least one group and the exterior membrane of an adjacent group are each selectively permeable to ions of the first polarity.

23. Compartments for electrodeionization apparatus of claim 21, wherein the exterior membranes of each group of compartments are each selectively permeable to ions of the first polarity.

24. Compartments for electrodeionization apparatus of claim 21, which further comprise:

a first electrode on a first side of the stacked group of compartments and in electrical communication therewith; a second electrode on a second side of the stacked group of compartments and in electrical communication therewith;

an electrical source in electrical communication with the first and second electrodes, which, in combination with the electrodes and the plurality of compartments, defines an electrical circuit; and a fluid circuit constructed and arranged to establish fluid streams through said at least one ion-concentrating compartment and said at least one ion-depleting compartment and to recover a depleted fluid product from said at least one ion-depleting compartment.

\* \* \* \* \*